United States Patent
Subramanian et al.

(10) Patent No.: US 9,697,228 B2
(45) Date of Patent: Jul. 4, 2017

(54) SECURE RELATIONAL FILE SYSTEM WITH VERSION CONTROL, DEDUPLICATION, AND ERROR CORRECTION

(71) Applicants: Jayashree Subramanian, Chennai (IN); Sekar Vembu, Chennai (IN)

(72) Inventors: Jayashree Subramanian, Chennai (IN); Sekar Vembu, Chennai (IN)

(73) Assignee: Vembu Technologies Private Limited, Chennai, Tamil Nadu (IN)

(*) Notice: Subject to any disclaimer, the term of this patent is extended or adjusted under 35 U.S.C. 154(b) by 309 days.

(21) Appl. No.: 14/685,604

(22) Filed: Apr. 14, 2015

(65) Prior Publication Data
US 2015/0293817 A1    Oct. 15, 2015

(51) Int. Cl.
G06F 17/30 (2006.01)
G06F 11/14 (2006.01)

(52) U.S. Cl.
CPC .... G06F 17/30212 (2013.01); G06F 11/1435 (2013.01); G06F 11/1448 (2013.01)

(58) Field of Classification Search
CPC ........... G06F 17/30212; G06F 11/1435; G06F 11/1448
USPC ......................................... 707/645
See application file for complete search history.

(56) References Cited

U.S. PATENT DOCUMENTS 7,272,613 B2 * 9/2007 Sim .................. G06F 17/30067 707/999.01
7,590,654 B2   9/2009 Gupta et al.
7,966,495 B2 * 6/2011 Ackerman ......... G06Q 20/3678 705/69

(Continued)

FOREIGN PATENT DOCUMENTS

CA         2512185 C    4/2012
WO    WO 2010/040078 A2 *  4/2010   ............. G06F 21/00

OTHER PUBLICATIONS

Xu, Pengzhi, et al., "Enabling Cloud Storage to Support Traditional Applications", ChinaGrid 2010, Guangzhou, China, Jul. 16-18, 2010, pp. 167-172.*
Stonebraker, Michael, et al., "Intel 'Big Data' Science and Technology Center Vision and Execution Plan", SIGMOD Record, vol. 42, No. 1, Mar. 2013, pp. 44-49.*
Mukherjee, Niloy, "Oracle SecureFiles System", PVLDB '08, Auckland, New Zealand, Aug. 23-28, 2008, pp. 1301-1312.*
Wires, Jake, et al., "Secure File System Versioning at the Block Level", EuroSys '07, Lisboa, Portugal, Mar. 21-23, 2007, pp. 203-215.*

(Continued)

*Primary Examiner* — Robert Stevens
(74) *Attorney, Agent, or Firm* — Ash Tankha; Lipton, Weinberger & Husick

(57) ABSTRACT

A computer implemented method and a secure relational file system (SRFS) for storing and managing data for backup and restore are provided. The SRFS receives data, generates first metadata including file-to-sector mapping information, splits the data into fixed sized data chunks (FSDCs), generates second metadata including logical boundaries used for splitting, creates fixed sized data blocks by prepending the second metadata to the FSDCs, splits each FSDC into variable sized data chunks (VSDCs), generates third metadata including unique identifiers (UIDs) for the VSDCs, creates variable sized data blocks (VSDBs) by prepending the third metadata and the second metadata to each VSDC, identifies unique variable sized data chunks (UVSDCs) of the VSDBs using the UIDs, stores the UVSDCs in chunk files, and stores the first metadata, the second metadata extracted from the VSDBs, and storage locations of the UVSDCs with the third metadata of the UVSDCs and duplicate VSDCs in databases.

24 Claims, 16 Drawing Sheets

(56) References Cited

U.S. PATENT DOCUMENTS

| | | | |
|---|---|---|---|
| 8,234,468 B1 | 7/2012 | Deshmukh et al. | |
| 8,315,984 B2 | 11/2012 | Frandzel | |
| 8,442,952 B1* | 5/2013 | Armangau | G06F 17/30159 |
| | | | 706/14 |
| 8,458,145 B2 | 6/2013 | Kopylovitz et al. | |
| 8,504,529 B1 | 8/2013 | Zheng et al. | |
| 8,521,705 B2 | 8/2013 | Jayaraman et al. | |
| 2006/0242167 A1 | 10/2006 | Singh et al. | |
| 2008/0052328 A1* | 2/2008 | Widhelm | G06F 17/30233 |
| 2012/0078855 A1 | 3/2012 | Beatty et al. | |
| 2012/0150826 A1* | 6/2012 | Vijayan Retnamma | G06F 17/30312 |
| | | | 707/692 |
| 2014/0188805 A1* | 7/2014 | Vijayan | G06F 11/1453 |
| | | | 707/646 |

OTHER PUBLICATIONS

"How NTFS Works", Windows Server 2003 Technical Reference, Mar. 28, 2003, Retrieved Sep. 12, 2011, 17 pages.

Russon, Richard; Fledel, Yuval, "NTFS Documentation". Retrieved Jun. 26, 2011, 138 pages.

Ghemawat, Sanjay; Gobioff, Howard; and Leung, Shun-Tak, 2003, "The Google File System", SIGOPS Oper. Syst. Rev. 37, 5 (Oct. 2003), 29-43. DOI=10.1145/1165389.945450, 15 pages.

Borthakur, Dhruba, "The Hadoop Distributed File System: Architecture and Design", Hadoop Project Website, Technical report, 2007, The Apache Software Foundation, 14 pages.

* cited by examiner

FIXED SIZED DATA CHUNK DEDUPLICATION

| BEFORE: | A Qui | ck Br | own F | ox Ju | mps O | ver t | he La | zy Do | g |
|---|---|---|---|---|---|---|---|---|---|
| AFTER: | The Q | uick | Brown | Fox J | umps | Over | the L | azy D | og |

FIG. 6A

VARIABLE SIZED DATA CHUNK DEDUPLICATION

| BEFORE: | A | Quick | Brown | Fox | Jumps | Over | the | Lazy | Dog |
|---|---|---|---|---|---|---|---|---|---|
| AFTER: | The | Quick | Brown | Fox | Jumps | Over | the | Lazy | Dog |

FIG. 6B

| SCENARIOS | WEEK 1 | WEEK 2 | WEEK 3 | WEEK 4 | WEEK 5 |
|---|---|---|---|---|---|
| STORAGE WITHOUT DEDUPLICATION (TB) | 1.4 | 3.3 | 5.7 | 9.1 | 13.7 |
| STORAGE WITH DEDUPLICATION (TB) | 1.01 | 1.06 | 1.17 | 1.25 | 1.37 |

SECURE RELATIONAL FILE SYSTEM WITH VERSION CONTROL, DEDUPLICATION, AND ERROR CORRECTION

CROSS-REFERENCE TO RELATED APPLICATIONS

This application claims priority to and the benefit of provisional patent application number 1972/CHE/2014 titled "Secure Relational File System With Version Control, Deduplication, And Error Correction", filed in the Indian Patent Office on Apr. 15, 2014, and non-provisional patent application number 1972/CHE/2014 titled "Secure Relational File System With Version Control, Deduplication, And Error Correction", filed in the Indian Patent Office on Apr. 13, 2015. The specifications of the above referenced patent applications are incorporated herein by reference in their entirety.

BACKGROUND

Archiving data on a computer storage device allows data retrieval in an event of a loss of the data. Hence, an electronic device, for example, a computer needs to provide data backup and data recovery. Recent trends comprising, for example, virtual machine technology and big data analytics that involve semantic searches and analytics of backed up data, offer a number of use cases for archived data by viewing the archived data as more than a passive storage. However, such use cases demand an advanced file system for organizing data in storage devices. The primary focus of conventional file system configurations is writing data into storage devices, for example, magnetic tapes, hard disks, etc., organizing the stored data into files and folders, and reading the stored data from the storage devices. Recently, file systems have evolved due to technology advances in the types of storage devices, for example, flash memory, optical storages, cloud storages, etc., and increasing smart applications that need a smart, flexible, fast, secure, reliable, and size conscious storage. However, there is no file system that is a panacea for requirements of these applications.

File systems typically store details about files comprising backup data, in a data structure. These file details comprise, for example, attributes, permissions, offsets and lengths of storage of a file, directory information, etc. An application, for example, an operating system that accesses a storage device either for reading files from or writing files into the storage device, first accesses metadata associated with the backup data to determine whereabouts of the files. Each file system stores the metadata in a different way. File systems, for example, new technology file systems (NTFSs) store the metadata in specific positions in a storage device, for example, a master boot record (MBR) in the first 512 bytes of storage and in a master file table (MFT) at an address pointed to by specific fields inside the MBR. However, there is a need for a file system that stores this metadata in one or more databases to provide substantial flexibility to an underlying file system in interpreting the underlying data in multiple ways based on a query that runs on the stored metadata and expediting metadata reads and writes.

Typically, management of metadata increases efficiency of the file system. Distributed file systems, for example, the Hadoop® Distributed File system (HDFS) of The Apache Software Foundation and the Google® File System (GFS) of Google Inc., the Windows® Future Storage (WinFS) data storage and management system of Microsoft Corporation, etc., are designed for applications that do not focus on optimizing properties that backup and recovery applications typically require. The Google® File System, for example, was designed for reducing search time of Google® searches; the HDFS was designed as a fault tolerant file system for running on low cost commodity hardware; and the WinFS file system is based on relational databases and is typically used for content-indexing the data stored in storage devices for allowing efficient searching of content in the stored data. However, these file systems do not consider optimizing both the read and write speed of the data and versioning of the stored data, and do not provide efficient ways of storage of the data, and thus, are not suitable for backup and recovery applications.

Storage mechanisms that modern file systems have started using, include data compression and data deduplication. Data compression typically is a data reduction technique with some convergence with data deduplication in an objective sense, given the focus of data compression on removing redundancy in underlying data. However, the manner and the scale at which removal of data redundancy is handled differ for data compression and data deduplication. Data compression comprises replacing long bit sequences with short bit sequences, improving transmission efficiency of data by constructing bits for common data patterns, modifying a file format, for example, a zip archive file format, a Roshal archive (RAR) file format, a tape archive (tar) file format, etc., and discarding unessential data, for example, in audio files or video files that results in a loss of data fidelity. Data compression is efficient for short data sets. In comparison, data deduplication is based on a principle of identifying blocks of duplicate data within files or raw disk images and storing only one copy of that block for each future reference. Some file systems comprising, for example, Zeta File system (ZFS®) of Oracle America, Inc., use variable length deduplication techniques to improve storage efficiency of backup data. Data compression does not remove blocks of duplicate data. For example, in data compression, if a block of data is identified as duplicate, that is, if the same content appears more than once, the content is compressed in each of its appearances in the backup data and stored in storage devices, whereas data deduplication stores only a single copy of the duplicate content. If data compression is applied to the deduplicated data, the file system stores only a unique compressed copy of the content. However, there is still a need for a file system that integrates such efficient storage mechanisms with other modern requirements of multiple applications such as backup and disaster recovery and file sharing, etc., across various platforms and manages metadata that provides flexibility and thus supports use cases, for example, inbuilt version control, integrity checks, etc., of the backed up data.

Deduplication refers to a technical methodology used for minimizing utilization of storage for a given amount of data. Deduplication is a data optimization technique used for identifying and leveraging similarities in a pattern among different sets or subsets of data in order to eliminate redundancy in the data. The backup and recovery domain with its inherent nature of conducting redundant operations is an application of deduplication principles. Typically, backup operations are scheduled to repetitively perform copying and storing of multiple identical data segments, for example, across multiple workstations, servers, and virtual environments in an organization. The data deduplication software substantially reduces physical disk space requirements. However, conventional deduplication solutions, in general, are not configured for extending a similar level of benefit to users.

Typically, a file system is designed for running on a specific hardware or for specific applications for optimizing a subset of properties that a specific application demands. These properties comprise, for example, read-write speed, data security, data storage efficiency, data storage reliability, etc. Consider an example where a backup and disaster recovery application supports large scale and advanced data restore use cases that range from an instant restoration of the backup data as virtual machines to big data analytics over the backup data. Such a backup and disaster recovery application requires a high speed read and write file system that is flexible enough to support multiple data restore use cases, that stores data efficiently with minimal disk storage usage, and that is secure and reliable to ensure data availability at any time, and supports versioning of backup data.

Recent hardware advances have taken care of speed of data access, while advanced concepts in data encryption have taken care of data security. Computer software was therefore required to handle reliability, versioning, and efficiency of data storage. Moreover, modern applications require a file system to be flexible enough to provide multiple interpretations of data that the file system manages. For example, if a file system deduplicates data by storing only unique non-redundant data to save storage space, the file system requires the capability to expose the unique data or all the data in a reduplicated form, to an application. Furthermore, a file system requires the capability to expose any version of a file or a disk image in such a reduplicated form. Such capabilities become plausible with the advent of databases, which provide a different perspective to metadata of file systems, that is, organization of information maintained in the file systems.

Deduplication technology uses proven methods that are established as standards in the data processing industry to reduce redundancy in storage of backup data. For example, some techniques comprise a method of transforming data into variable sized data blocks, and eliminating duplicate data blocks referring to a data block by storing only a single instance of the data block to which the duplicate data blocks refer. However, during restoration of the duplicate data blocks, copying and accessing the unique data blocks that are being referenced are expensive processes. Given the information explosion in the digital world, analysts predict that businesses, on an average, will double their data every two years. Merely providing storage for the data is not a cost effective solution. Due to the need for retaining historical snapshots of the data, the storage costs are bound to increase exponentially. Besides storage capacity, the more data there is to manage, the greater is the impact and costs associated with provisioned servers, network bandwidth, and human resources to manage the infrastructure. Due to this high volume data growth, backup and restore products still need to meet recovery time objectives and recovery point objectives.

Hence, there is a long felt but unresolved need for a computer implemented method and a secure relational file system that store data and manage changes to the data in a storage device for backup and restore with inbuilt version control, deduplication, encryption, and integrity checks with error correction. Moreover, there is a need for a computer implemented method and a secure relational file system that perform metadata storage and management for providing substantial flexibility to support multiple advanced use cases for the stored data.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and the secure relational file system disclosed herein address the above stated needs for storing data and managing changes to the data in a storage device for backup and restore with inbuilt version control, deduplication, encryption, and integrity checks with error correction. Moreover, the computer implemented method and the secure relational file system disclosed herein perform metadata storage and management for providing substantial flexibility to support multiple advanced use cases for the stored data. The computer implemented method disclosed herein employs the secure relational file system comprising at least one processor configured to execute computer program instructions for storing data and managing changes to the data in a storage device for backup and restore. The secure relational file system receives the data for backup and restore and generates three types of metadata at a backup level, a fixed block data level, and a variable block data level. The secure relational file system generates first metadata associated with the received data for backup. The first metadata comprises, for example, file-to-sector mapping information associated with disk storage of the received data in multiple sectors in the storage device, for example, for a disk image backup. Using this file-to-sector mapping information, the secure relational file system identifies a position of the received data in the storage device and unused sectors and/or unused data blocks in the storage device for reducing size of storage required for the backup of the received data. The first metadata further comprises, for example, metadata associated with archived data and archived changes to the data for availability during backup, metadata of a file system used in creation of the disk storage, metadata stored by a file system used in creation of a disk image of the disk storage, metadata of a virtual machine comprising the archived data, and one or more of attributes, permissions, locations, content specifics, offsets, a size of the disk storage, directory information of the received data, etc.

The secure relational file system splits the received data into multiple fixed sized data chunks, that is, data chunks of a fixed length or, in an embodiment, data chunks of an equal length, using the generated first metadata. The secure relational file system generates second metadata for each of the fixed sized data chunks for restore of the received data. The second metadata comprises, for example, logical boundaries used for splitting the received data. The secure relational file system creates multiple fixed sized data blocks from the fixed sized data chunks by prepending the generated second metadata to the fixed sized data chunks. The secure relational file system splits each of the fixed sized data chunks of each of the created fixed sized data blocks into multiple variable sized data chunks using multiple context aware breakpoints in the fixed sized data chunks. The secure relational file system generates a unique identifier for each of the variable sized data chunks. The secure relational file system generates third metadata for each of the variable sized data chunks. The third metadata comprises this generated unique identifier. The secure relational file system creates multiple variable sized data blocks by prepending the generated third metadata of each of the variable sized data chunks and the generated second metadata from each of the created fixed sized data blocks to each of the variable sized data chunks.

The secure relational file system, in communication with one or more databases, identifies unique variable sized data chunks of the created variable sized data blocks using the generated unique identifiers from the generated third metadata for deduplication of the variable sized data chunks. The duplicate variable sized data chunks of the created variable sized data blocks are configured to point to a storage location of a unique instance of the duplicate variable sized data chunks. The secure relational file system identifies, tracks, and maintains a single compressed and encrypted copy of each of the identified unique variable sized data chunks. The secure relational file system stores the identified unique variable sized data chunks in one or more chunk files of the secure relational file system for backup and restore of the received data. The secure relational file system adds a location of storage of each of the identified unique variable sized data chunks in the chunk files to the generated third metadata. The secure relational file system stores the first metadata generated from backup information, the generated second metadata extracted from each of the created variable sized data blocks, and the generated third metadata of the identified unique variable sized data chunks and duplicate variable sized data chunks extracted from each of the created variable sized data blocks in one or more databases with minimal additional storage consumption for restore of the received data. Storing the first metadata, the second metadata, and the third metadata in one or more databases provides substantial flexibility to interpret data organized by the secure relational file system in multiple ways. By storing the first metadata, the second metadata, and the third metadata, the secure relational file system also stores the storage locations of the identified unique variable sized data chunks in the databases.

The secure relational file system restores backup data as follows. The secure relational file system receives the stored third metadata comprising the location of storage of each of the identified unique variable sized data chunks in the chunk files and a pointer for each of the duplicate variable sized data chunks from the databases. The pointer points to a unique instance of each of the duplicate variable sized data chunks. The secure relational file system retrieves the identified unique variable sized data chunks from the chunk files using the location of storage of each of the identified unique variable sized data chunks in the chunk files from the received third metadata. The secure relational file system retrieves, from the chunk files, the unique instance of each of the duplicate variable sized data chunks, to which the pointer from the received third metadata points for retrieving each of the duplicate variable sized data chunks. The secure relational file system receives the stored second metadata comprising the logical boundaries used for splitting the received data into fixed sized data chunks and the stored first metadata comprising the file-to-sector mapping information. The secure relational file system assembles the retrieved unique variable sized data chunks and the retrieved unique instance of each of the duplicate variable sized data chunks in a predefined order to form the fixed sized data chunks using the received second metadata and restores the backup data by restoring the assembled fixed sized data chunks at a target location, for example, at a client device, identified using the received first metadata.

In one or more embodiments, related systems include but are not limited to circuitry and/or programming for effecting the methods referenced herein; the circuitry and/or programming can be any combination of hardware, software, and/or firmware configured to effect the herein-referenced methods depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIGS. 6A-6B exemplarily illustrate deduplication of fixed sized data chunks and variable sized data chunks for storing data and managing changes to the data in a storage device.

DETAILED DESCRIPTION OF THE INVENTION

Figure 1:
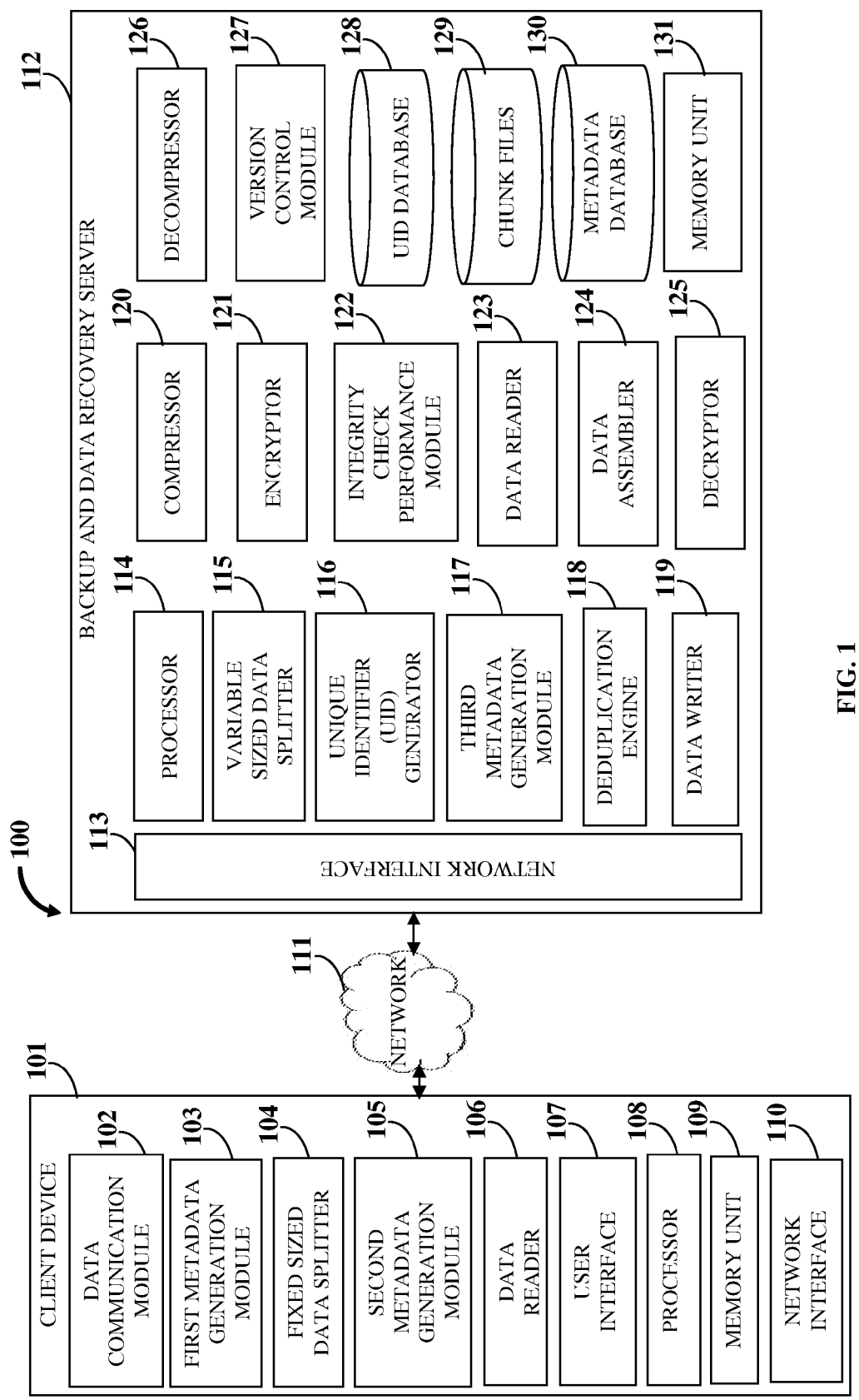
FIG. 1 exemplarily illustrates a secure relational file system for storing data and managing changes to the data in a storage device for backup and restore.

FIG. 1 exemplarily illustrates a secure relational file system (SRFS) 100 for storing data and managing changes to the data in a storage device for backup and restore. In an embodiment, the SRFS 100 is implemented as a client-server system comprising one or more of multiple modules distributed among one or more server systems and one or more client devices 101 for backup and restore as exemplarily illustrated in FIG. 1. In an embodiment, the SRFS 100 is implemented in a cloud computing environment. As used herein, "cloud computing environment" refers to a processing environment comprising configurable computing physical and logical resources, for example, networks, servers, storage, applications, services, etc., and data distributed over a network 111, for example, the internet. The cloud computing environment provides on-demand network access to a shared pool of the configurable computing physical and logical resources. In this embodiment, the SRFS 100 is a cloud computing based platform implemented as a service for storing data and managing changes to the data in a storage device for backup and restore. The SRFS 100 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

As exemplarily illustrated in FIG. 1, the secure relational file system (SRFS) 100 comprises a backup and data recovery (BDR) server 112 accessible by one or more client devices 101 via a network 111. The BDR server 112 is configured as high-performing computing equipment, for example, as one or more servers associated with one or more online services, a computer with a processor 114 such as a quad-core processor and a memory unit 131, or a computing cluster in a cloud computing environment. The client devices 101 are electronic devices, for example, personal computers, tablet computing devices, mobile computers, mobile phones, smart phones, portable computing devices, laptops, personal digital assistants, touch centric devices, workstations, portable electronic devices, network enabled computing devices, interactive network enabled communication devices, any other suitable computing equipment, combinations of multiple pieces of computing equipment, etc. The electronic devices may also be hybrid devices that combine the functionality of multiple devices. Examples of hybrid electronic devices comprise portable devices that receive electronic mails (emails), support mobile telephone calls, and support web browsing. Computing equipment may be used to implement applications such as media playback applications, a web browser, a mapping application, an email application, a calendar application, etc.

The network 111 for accessing the backup and data recovery (BDR) server 112 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

As exemplarily illustrated in FIG. 1, the client device 101 comprise a network interface 110, a processor 108, and a non-transitory computer readable storage medium such as a memory unit 109 communicatively coupled to the processor 108 for storing computer program instructions defined by modules 102, 103, 104, 105, 106, etc., of the secure relational file system (SRFS) 100. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 108 or 114, except for a transitory, propagating signal. The modules of the SRFS 100 at the client device 101 comprise a data communication module 102, a first metadata generation module 103, a fixed sized data splitter 104, a second metadata generation module 105, and a data reader 106. The SRFS 100 provides a user interface 107 for receiving one or more requests for data backup and data restore on the client device 101. The functions of the modules 102, 103, 104, 105, 106, etc., of the SRFS 100 are disclosed in the detailed description of FIGS. 2A-2B.

As exemplarily illustrated in FIG. 1, the backup and data recovery (BDR) server 112 comprises a network interface 113, a processor 114, a variable sized data splitter 115, a unique identifier (UID) generator 116, a third metadata generation module 117, a deduplication engine 118, a data writer 119, a compressor 120, an encryptor 121, an integrity check performance module 122, a data reader 123, a data assembler 124, a decryptor 125, a decompressor 126, a version control module 127, a UID database 128, chunk files 129, a metadata database 130 for storing metadata associated with the data to be backed up, and a non-transitory computer readable storage medium such as a memory unit 131. The memory unit 131 communicatively coupled to the processor 114 stores computer program instructions defined by the modules 115, 116, 117, 118, 119, 120, 121, 122, 123, 124, 125, 126, 127, etc., of the secure relational file system (SRFS) 100. Functions of the modules 115, 116, 117, 118, 119, 120, 121, 122, 123, 124, 125, 126, 127, etc., of the SRFS 100 are disclosed in the detailed description of FIGS. 2A-2B and FIG. 3.

The database storing the chunk files 129 and the metadata database 130 constitute a storage layer of the secure relational file system (SRFS) 100. The unique identifier (UID) database 128, the database storing the chunk files 129, and the metadata database 130 are any storage areas or mediums that can be used for storing data and files. The UID database 128, the database storing the chunk files 129, the metadata database 130 can be, for example, any of a structured query language (SQL) data store such as SQL Server® of Microsoft Corporation, Oracle® servers, MySQL® database developed by MySQL AB Company or a not only SQL (NoSQL) data store such as the mongoDB® of MongoDB, Inc., the Neo4j graph database of Neo Technology Corporation, the Cassandra database of the Apache Software Foundation, the HBase™ database of the Apache Software Foundation, etc. In an embodiment, the databases 128, 129, and 130 can also be a location on a file system. In another embodiment, the databases 128, 129, and 130 can be remotely accessed by the SRFS 100 via the network 111. In another embodiment, the databases 128, 129, and 130 are configured as cloud based databases implemented in a cloud computing environment, where computing resources are delivered as a service over the network 111.

The processors 108 and 114 refer to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processors 108 and 114 may also be implemented as processor sets comprising, for example, a programmed microprocessor and a math or graphics coprocessor. The processors 108 and 114 are selected, for example, from the Intel® processors such as the Itanium° microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS° reduced instruction set computer (RISC) processor of MIPS Technologies, Inc., RISC based computer processors of ARM Holdings, Motorola° processors, Qualcomm° processors, etc. The secure relational file system (SRFS) 100 disclosed herein is not limited to employing the processors 108 and 114. The SRFS 100 may also employ a controller or a microcontroller. The processor 108 executes the modules, for example, 102, 103, 104, 105, 106, etc., of the client device 101, and the processor 114 executes the modules, for example, 115, 116, 117, 118, 119, 120, 121, 122, 123, 124, 125, 126, 127, etc., of the backup and data recovery (BDR) server 112.

The processor 108 of the client device 101 executes an operating system, for example, the Linux® operating system, the Unix® operating system, any version of the Microsoft° Windows° operating system, the Mac OS of Apple Inc., the IBM° OS/2, VxWorks® of Wind River Systems, Inc., QNX Neutrino® developed by QNX Software Systems Ltd., the Palm OS° , the Solaris operating system developed by Sun Microsystems, Inc., the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The processor 114 of the backup and data recovery (BDR) server 112 executes a server operating system, for example, the Linux® operating system, the Unix® operating system, any version of the Microsoft® Windows® operating system, the Mac OS® of Apple Inc., the Solaris operating system developed by Sun Microsystems, Inc., etc. The secure relational file system (SRFS) 100 employs the respective operating systems for performing multiple tasks. Each operating system is responsible for management and coordination of activities and sharing of resources of the SRFS 100. The operating system further manages security of the SRFS 100, peripheral devices connected to the SRFS 100, and network connections. The operating system executes different programs using the respective processors 108 and 114. The processors 108 and 114 and the operating system together define a computer system for which application programs in high level programming languages are written.

Figure 2A:
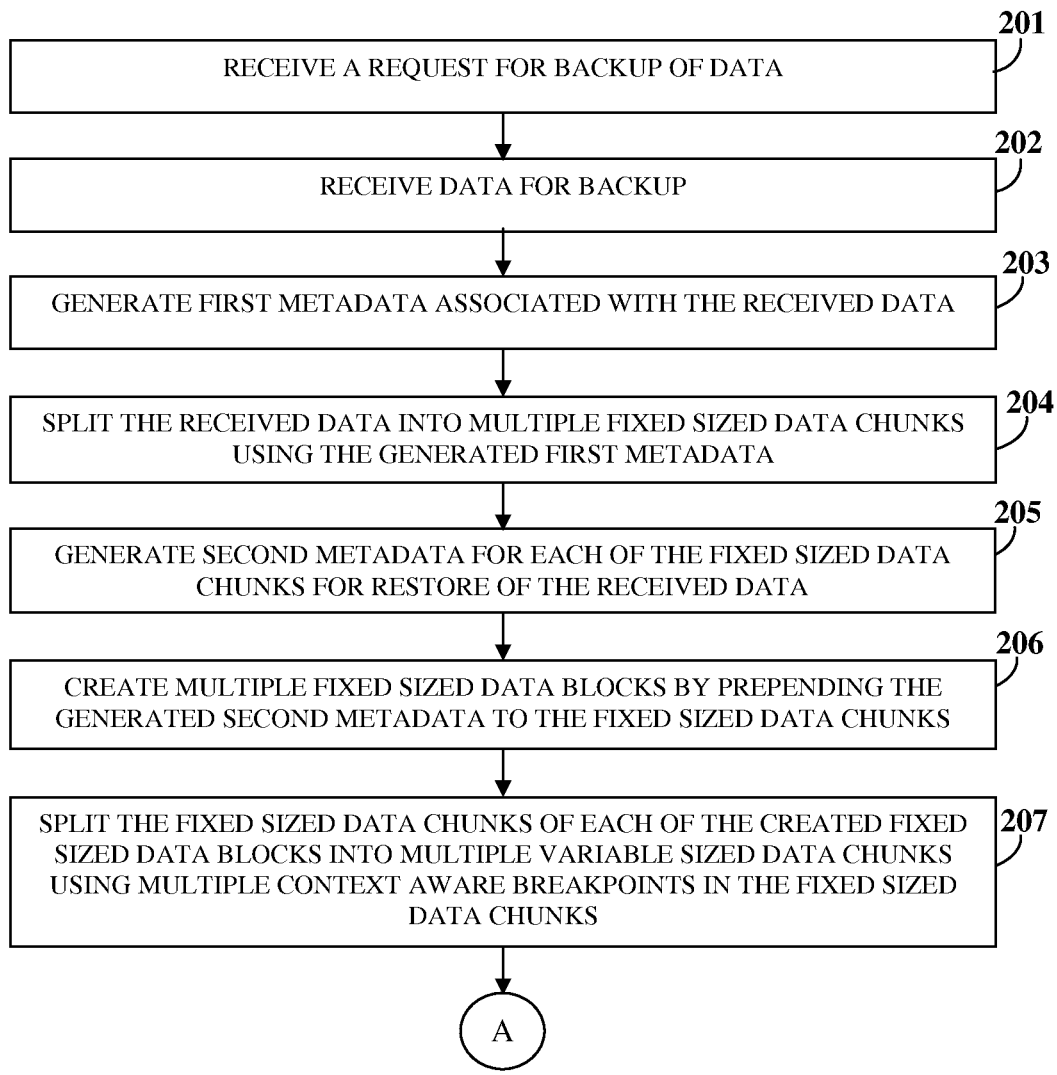
FIGS. 2A-2B exemplarily illustrate a computer implemented method for storing data and managing changes to the data in a storage device for backup.
Figure 2B:
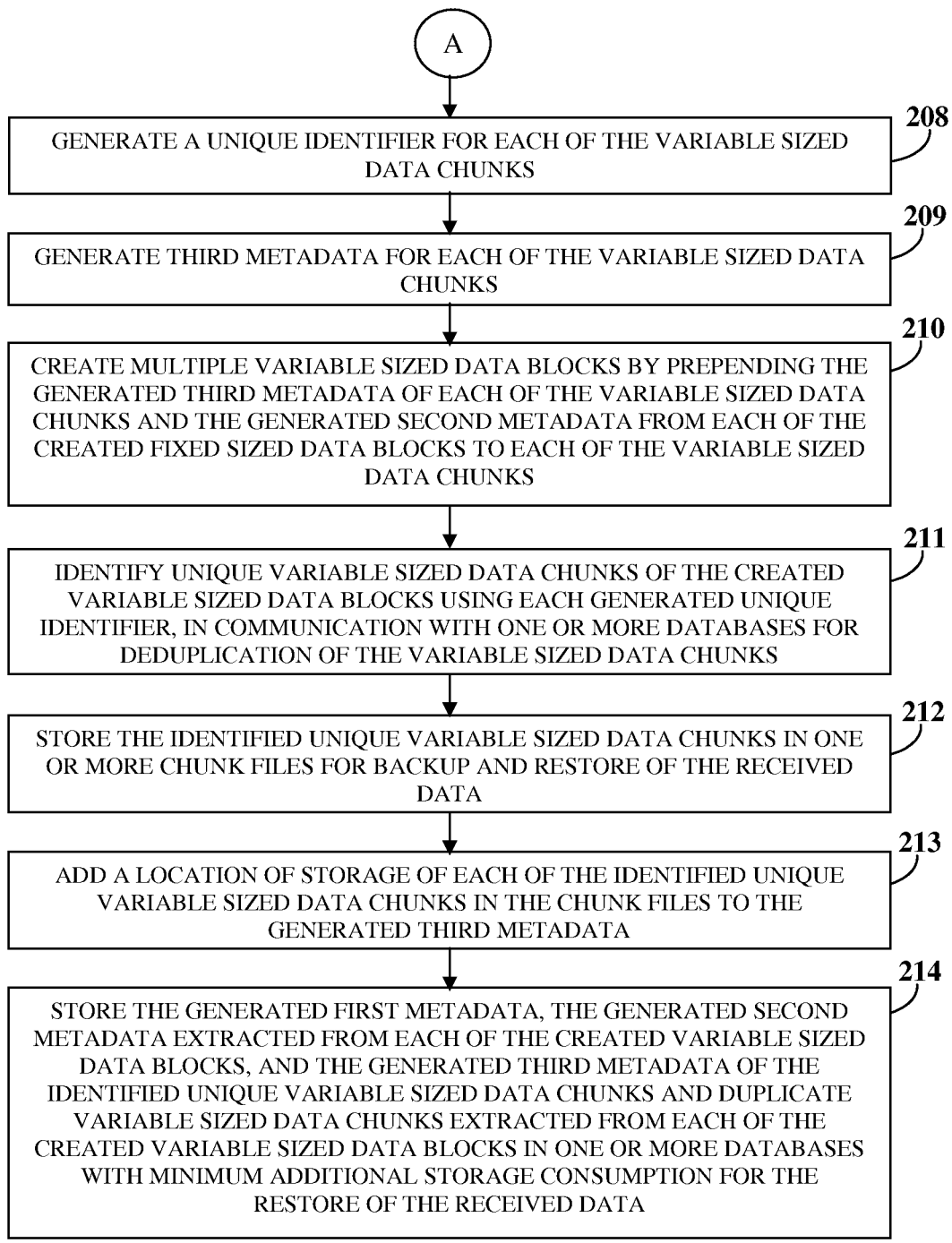
Figure 3:
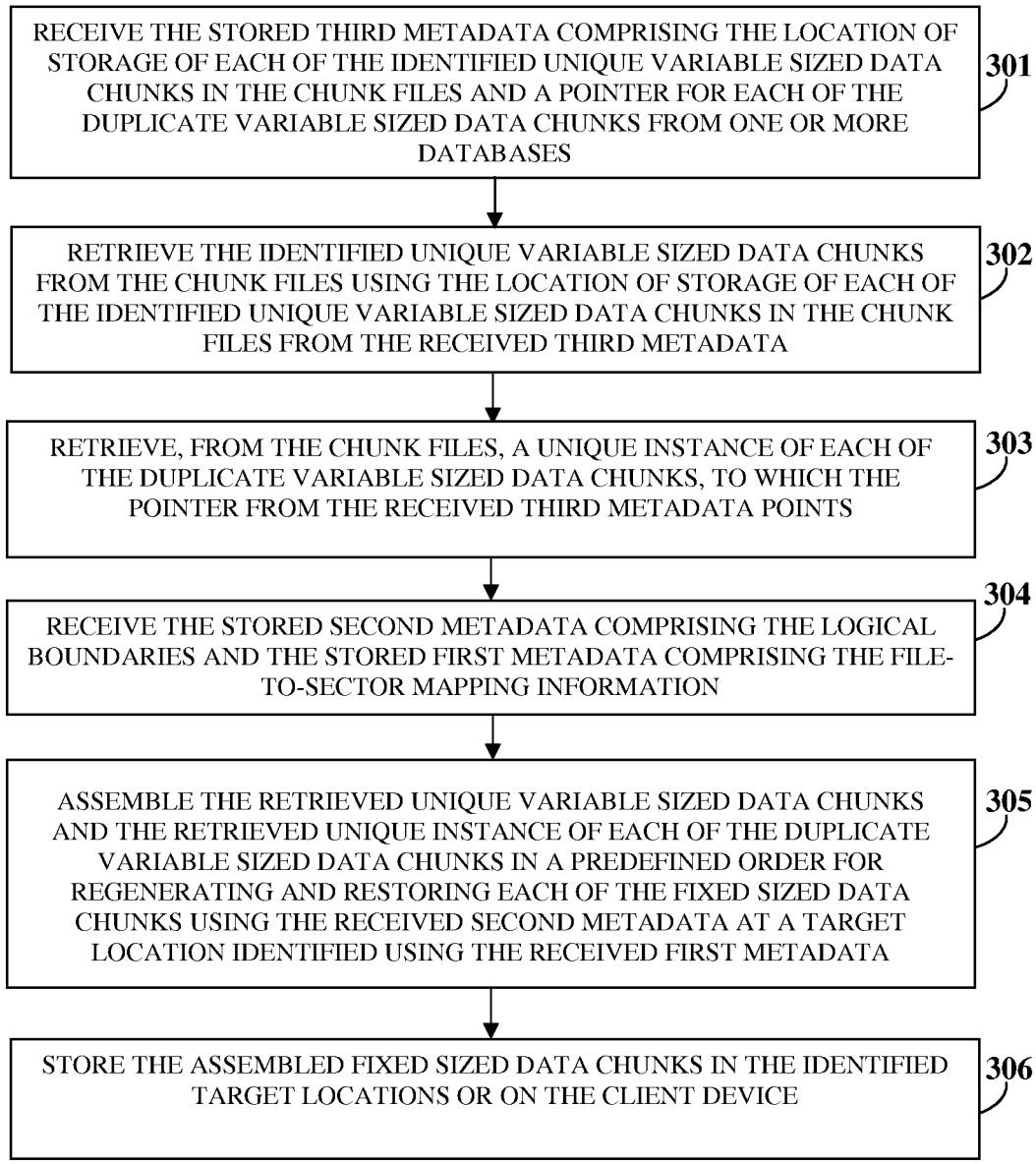
FIG. 3 exemplarily illustrates a computer implemented method for restoring backup data.

The processor 108 of the client device 101 retrieves instructions defined by the data communication module 102, the first metadata generation module 103, the fixed sized data splitter 104, the second metadata generation module 105, the data reader 106, etc., for performing respective functions disclosed in the detailed description of FIGS. 2A-2B, while the processor 114 of the backup and data recovery (BDR) server 112 retrieves instructions defined by the variable sized data splitter 115, the unique identifier (UID) generator 116, the third metadata generation module 117, the deduplication engine 118, the data writer 119, the compressor 120, the encryptor 121, the integrity check performance module 122, the data reader 123, the data assembler 124, the decryptor 125, the decompressor 126, the version control module 127, etc., for performing respective functions disclosed in the detailed description of FIGS. 2A-2B and FIG. 3. The processors 108 and 114 retrieve instructions for executing the modules, for example, 102, 103, 104, 105, 106, etc., of the client device 101, and the modules, for example, 115, 116, 117, 118, 119, 120, 121, 122, 123, 124, 125, 126, 127, etc., of the BDR server 112 respectively, from the memory units 109 and 131 respectively. A program counter determines the location of the instructions in each of the memory units 109 and 131. The program counter stores a number that identifies the current position in the program of each of the modules, for example, 102, 103, 104, 105, 106, 115, 116, 117, 118, 119, 120, 121, 122, 123, 124, 125, 126, 127, etc., of the secure relational file system (SRFS) 100. The instructions fetched by the processors 108 and 114 from the memory units 109 and 131 respectively, after being processed are decoded. The instructions are stored in an instruction register in each of the respective processors 108 and 114. After processing and decoding, the processors 108 and 114 execute the instructions, thereby performing one or more processes defined by those instructions.

At the time of execution, the instructions stored in the instruction register are examined to determine the operations to be performed. The processors 108 and 114 then perform the specified operations. The operations comprise arithmetic operations and logic operations. The respective operating systems perform multiple routines for performing a number of tasks required to assign the memory for execution of the modules, for example, 102, 103, 104, 105, 106, 115, 116, 117, 118, 119, 120, 121, 122, 123, 124, 125, 126, 127, etc., of the secure relational file system (SRFS) 100. The tasks performed by the respective operating systems comprise, for example, assigning memory to the modules, for example, 102, 103, 104, 105, 106, 115, 116, 117, 118, 119, 120, 121, 122, 123, 124, 125, 126, 127, etc., of the SRFS 100, and to data used by the SRFS 100, moving data between the memory units 109 and 131 and disk units, and handling input/output operations. The respective operating systems perform the tasks on request by the operations and after performing the tasks, the operating systems transfer the execution control back to their respective processors 108 and 114. The processors 108 and 114 continue the execution to obtain one or more outputs.

The memory units 109 and 131 are used for storing programs, applications, and data. For example, the data communication module 102, the first metadata generation module 103, the fixed sized data splitter 104, the second metadata generation module 105, the data reader 106, etc., are stored in the memory unit 109 of the client device 101, while the variable sized data splitter 115, the unique identifier (UID) generator 116, the third metadata generation module 117, the deduplication engine 118, the data writer 119, the compressor 120, the encryptor 121, the integrity check performance module 122, the data reader 123, the data assembler 124, the decryptor 125, the decompressor 126, the version control module 127, etc., are stored in the memory unit 131 of the backup and data recovery (BDR) server 112. The memory units 109 and 131 can be, for example, a random access memory (RAM) or another type of dynamic storage device that stores information and instructions for execution by the processors 108 and 114 respectively. The memory units 109 and 131 also store temporary variables and other intermediate information used during execution of the instructions by the processors 108 and 114 respectively. The secure relational file system (SRFS) 100 further comprises a read only memory (ROM) or another type of static storage device that stores static information and instructions for each of the processors 108 and 114.

The network interfaces 110 and 113 enable connection of the secure relational file system (SRFS) 100 to the network 111. For example, the network interfaces 110 and 113 enable connection of the client device 101 and the backup and data recovery (BDR) server 112 respectively to the network 111. In an embodiment, the network interfaces 110 and 113 are provided as interface cards also referred to as line cards. The network interfaces 110 and 113 comprise, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc.

FIGS. 2A-2B exemplarily illustrate a computer implemented method for storing data and managing changes to the data in a storage device for backup. The computer implemented method disclosed herein employs the secure relational file system (SRFS) 100 comprising at least one processor, for example, processors 108 and 114 exemplarily illustrated in FIG. 1, configured to execute computer program instructions for storing data and managing changes to the data in the storage device for backup and restore. The SRFS 100 is a file system configured for large scale backup and data recovery (BDR) or disaster recovery applications with support for advanced use cases comprising, for example, restoring data from an incremental backup at any point in time, integrity checks, semantic searches, analytics of the backed up data, etc. The SRFS 100 is a user level file system that can be incorporated on top of native file systems, for example, new technology file systems (NTFSs). The SRFS 100 is configured as a file system of file systems with inbuilt version control, deduplication, encryption, and integrity checks with inbuilt error correction, which are requirements of a BDR application that supports multiple advanced use cases for archived data. As used herein, the term "deduplication" refers to eliminating redundant data by storing only unique non-redundant data to enhance reduction of size of data storage. Deduplication minimizes the utilization of storage for a given amount of data.

The data communication module 102 of the secure relational file system (SRFS) 100, for example, at the client device 101 exemplarily illustrated in FIG. 1, receives 201 a request for backup of data via the user interface 107 exemplarily illustrated in FIG. 1. The request comprises backup information about the backup, for example, a disk selected for backup, a list of files and folders selected for backup, or a virtual machine selected for backup, a type of backup such as a disk image backup, a file backup, or a virtual machine backup, version information indicating whether the backup is a full backup or an incremental backup, an incremental version number if the backup is an incremental backup, etc. The data communication module 102 transmits this backup information to the data reader 106 and the first metadata generation module 103 of the SRFS 100 exemplarily illustrated in FIG. 1, for generating first metadata associated with the data to be backed up. The data reader 106 receives 202, that is, reads the data to be backed up from the disk or files or virtual machines.

Typically, data in a computer can be backed up, for example, using a file backup, a disk image backup, or a virtual machine (VM) backup. As used herein, "virtual machine" refers to an emulation of a physical computer. The file backup archives each individual file and organization information of each individual file. The organization information comprises, for example, directory hierarchy and file hierarchy. In the disk image backup, instead of a file, sectors in the disk where the files and folders are stored are backed up. The disk image backup copies disk volume or a volume of an entire storage device sector by sector or bit by bit. The disk image backup may depend on an underlying file system using which the disk image is built. Use of native file system information of the disk image helps in reducing size of the storage required for backup of the data, since by using the file system information, unused sectors and/or unused data blocks in a storage device can be identified. The secure relational file system (SRFS) 100 can use the native file system information to restore files and folders from the disk image backup or search for contents inside the files and folders without having to restore the entire backup. The first metadata generation module 103 uses this additional information about the native file system for generation of the first metadata on receiving the backup request at the data communication module 102.

In the virtual machine (VM) backup, the VM is copied to the backup storage device. In such cases, software used for creating the VMs comprises a file that is a clone of the VM storage along with metadata of the VM storage. The secure relational file system (SRFS) 100 performs a file backup of the file representing the entire VM. The entire VM can be restored entirely by archiving this file. The SRFS 100 performs the file backup, the disk image backup, and the VM backup efficiently, thereby enabling modern applications to use the archived data in multiple ways. The data communication module 102 on the client device 101 also transmits the data read from files, disk images, virtual machine data comprising, for example, virtual machine disk (VMDK) data or virtual hard disk (VHD) data, etc., to the backup and data recovery (BDR) server 112 to be backed up into the BDR server 112.

The first metadata generation module 103 generates 203 first metadata associated with the received data for backup of the received data. The first metadata generation module 103 generates metadata at a backup level. The first metadata generation module 103 generates the first metadata when the data communication module 102 receives the backup request for a new full backup or an incremental backup and for each file and folder in the case of a file backup, for each disk image of every disk drive in the case of a disk image backup, and for each virtual machine in a virtual machine backup. The first metadata is unlimited and the more information stored in the metadata database 130 exemplarily illustrated in FIG. 1, as part of the first metadata, the more is the flexibility provided by the secure relational file system (SRFS) 100 in interpreting underlying data in multiple ways. The first metadata comprises metadata associated with archived data and archived changes to the data for availability during backup, metadata of a file system used in creation of the disk storage, metadata stored by a file system used in creation of a disk image of the disk storage, for example, data stored in a master file table (MFT), metadata of a virtual machine comprising the archived data, and one or more of attributes, permissions, locations, content specifics, offsets, a size of the disk storage, directory information of the received data, etc. That is, the first metadata comprises information about the files and folders or disk images or virtual machines that are backed up, the file permissions, the file size, the file or folder locations with respect to a root folder associated with the file, etc. Such information helps in restoring a specific file stored inside a disk image backup without having to restore the entire disk image backup. The first metadata can also comprise specific data related to the contents of the files and folders stored in the disk image, for example, indexes of the file contents that can allow searching of content of the files stored in the disk image without having to restore the disk image or the files inside the disk image.

The first metadata differs depending on the type of data, that is, files and folders or disk images or virtual machines, that is backed up. The first metadata further comprises, for example, file-to-sector mapping information associated with disk storage of the received data in multiple sectors in the storage device. As used herein, "file-to-sector mapping information" refers to mapping information associated with storage of a file comprising data to be backed up, in one or more of multiple sectors of a storage device on a client device 101. The file-to-sector mapping information comprises, for example, a location of storage of the data to be backed up, on the client device 101. Using the file-to-sector mapping information, the secure relational file system (SRFS) 100 identifies a position of the received data in the storage device and the unused sectors and/or the unused data blocks in the storage device for reducing size of storage required for the backup of the received data on the client device 101. The SRFS 100 maintains the file-to-sector mapping information in the metadata database 130. This file-to-sector mapping information is used for retrieval of backed up data during file restoration. Thus, the SRFS 100 generates the first metadata, which includes the file-to-sector mapping information used in identifying a position of the data to be backed up in the storage device on the client device 101. The data communication module 102 receives the generated first metadata from the first metadata generation module 103 and transmits the generated first metadata to the backup and data recovery (BDR) server 112 over the network 111 exemplarily illustrated in FIG. 1. By transmitting the generated first metadata to the BDR server 112, the client device 101 establishes a handshake with the BDR server 112 for initiating the data backup. The data communication module 102 feeds the received data that the data reader 106 reads and the generated first metadata to the fixed sized data splitter 104.

The fixed sized data splitter 104 of the secure relational file system (SRFS) 100 exemplarily illustrated in FIG. 1, splits 204 the received data into multiple fixed sized data chunks using the generated first metadata. As used herein, "fixed sized data chunks" refer to segments or chunks of the received data that are of a fixed size. For example, the fixed sized data chunks can be one or more chunks of the received data that are of fixed lengths or multiple chunks of the received data that are equal in length. The fixed sized data splitter 104 determines a dimension to be used for splitting the received data, for example, logical boundaries for each of the fixed sized data chunks, based on one or more splitting parameters. The splitting parameters comprise, for example, a total size of the received data, data handling capacity of the fixed sized data splitter 104, one or more data patterns such as repetition of strings of data in the received data, an overhead of the metadata generated, etc. The fixed sized data splitter 104 obtains one or more of the splitting parameters from the generated first metadata. The second metadata generation module 105 of the SRFS 100 exemplarily illustrated in FIG. 1, generates 205 second metadata for each of the fixed sized data chunks for restore of the received data. The second metadata comprises logical boundaries of each of the fixed sized data chunks that the fixed sized data splitter 104 uses for splitting the received data. In an embodiment, the second metadata further comprises a unique identifier (UID) for each fixed sized data chunk. The UID is a checksum of the content in each of the fixed sized data chunks. The SRFS 100 uses the UIDs and the logical boundaries to identify the changed fixed sized data chunks while performing an incremental backup.

The fixed sized data splitter 104 creates 206 multiple fixed sized data blocks or fixed length data blocks by prepending the generated second metadata to the fixed sized data chunks. As used herein, "fixed sized data blocks" refer to blocks of data comprising the fixed sized data chunks prepended with the second metadata of the fixed sized data chunks. The data communication module 102 transmits the fixed sized data blocks to the backup and data recovery (BDR) server 112 from the client device 101 via the network 111 exemplarily illustrated in FIG. 1. On receiving the fixed sized data blocks, the variable sized data splitter 115 of the SRFS 100 exemplarily illustrated in FIG. 1, splits 207 the fixed sized data chunks of each of the created fixed sized data blocks into multiple variable sized data chunks using multiple context aware breakpoints in the fixed sized data chunks. As used herein, "variable sized data chunks" refer to segments of the fixed sized data chunks, for example, one or more chunks of the fixed sized data chunks that are of variable lengths. Consider an example where the fixed sized data splitter 104 creates a fixed sized data block comprising metadata MD2 and a fixed sized data chunk 11001101 of a fixed length of 8 bits. In this example, the variable sized data splitter 115 splits the fixed sized data chunk 11001101 of the fixed sized data block into variable sized data chunks of variable lengths such as 110, 0, 110, and 1. Also, used herein "context aware breakpoints" refer to logical breakpoints inserted in the data chunks for splitting the data chunks based on the context of the data in the data chunks. The SRFS 100 generates multiple context aware breakpoints using finger printing algorithms, for example, the Rabin-Karp algorithm and the Aho-Corasick algorithm. The variable sized data splitter 115 comprises, for example, a Rabin-Karp fingerprint splitter. The Rabin-Karp fingerprint splitter executes the Rabin-Karp algorithm to split data using hashing techniques to find a set of pattern strings in the data and introduce a breakpoint whenever such pattern strings are found. The Rabin-Karp fingerprint splitter executes the Rabin-Karp algorithm to split the fixed sized data chunks of each of the created fixed sized data blocks into variable sized data chunks that maximize the duplicate data present in the storage device. In an embodiment, the SRFS 100 stores the logical boundaries of each of the fixed sized data chunks and the variable sized data chunks in one or more databases, for example, the metadata database 130 while backing up the received data.

The unique identifier (UID) generator 116 of the secure relational file system (SRFS) 100 exemplarily illustrated in FIG. 1, generates 208 a UID for each of the variable sized data chunks. The UID generator 116 executes one or more algorithms comprising, for example, the Secure Hash Algorithm (SHA)-512/256 for generating the UIDs. The UID generator 116 generates the UIDs for the variable sized data chunks obtained from the fixed sized data chunks of the fixed sized data blocks and not for the second metadata in the fixed sized data blocks. These UIDs, also referred to as fingerprints, uniquely identify large data chunks using a small string of data. These UIDs are identical for the variable sized data chunks containing identical content. Hence, the SRFS 100 uses the UIDs to identify and eliminate redundancy in the backup data. The third metadata generation module 117 of the SRFS 100 exemplarily illustrated in FIG. 1, generates 209 third metadata for each of the variable sized data chunks. The third metadata comprises the generated UIDs of the variable sized data chunks. The third metadata further comprises data associated with the backup comprising, for example, data of a file system used for storing the backup data and an index of contents of the variable sized data chunks, which allows the contents of the backup data to be searched. The more metadata associated with the backup added to the metadata database 130, more is the flexibility achieved in interpreting the underlying backed up data in multiple ways. The contents of the metadata depend on an interpretation that an application requires in interpreting the underlying backed up data. The variable sized data splitter 115 creates 210 multiple variable sized data blocks by prepending the generated third metadata of each of the variable sized data chunks and the generated second metadata from each of the created fixed sized data blocks to each of the variable sized data chunks. As used herein, "variable sized data blocks" refer to blocks of data comprising the variable sized data chunks prepended with the third metadata of the variable sized data chunks and the second metadata of the fixed sized data chunks of the fixed sized data blocks from which the variable sized data chunks are derived.

The deduplication engine 118 of the secure relational file system (SRFS) 100 exemplarily illustrated in FIG. 1, identifies 211 unique variable sized data chunks of the created variable sized data blocks using each generated unique identifier (UID) from the generated third metadata prepended to the variable sized data chunks in the created variable sized data blocks, in communication with one or more databases, for example, the UID database 128 of the SRFS 100 exemplarily illustrated in FIG. 1, for deduplication of the variable sized data chunks. The comparison of the UIDs of the variable sized data chunks with the UIDs stored in the UID database 128 eliminates the need to perform a tedious comparison of the variable sized data chunks of the variable sized data blocks. The UIDs stored in the UID database 128 are the UIDs of the variable sized data chunks already identified as unique variable sized data chunks and stored in the chunk files 129 exemplarily illustrated in FIG. 1. The deduplication engine 118, on receiving the variable sized data blocks comprising the variable sized data chunks with the UIDs, compares the UIDs with the UIDs of the variable sized data chunks already stored in the chunk files 129. The deduplication engine 118 deduplicates the variable sized data chunks as and when the variable sized data blocks arrive at the deduplication engine 118 from the variable sized data splitter 115.

The chunk files 129 comprise groups of unique variable sized data chunks and are stored as regular files in a native file system such as new technology file system (NTFS) or fourth extended (ext4) file systems. The size of a chunk file is a configurable parameter. The deduplication engine 118 stores the UIDs of each of the unique variable sized data chunks that the deduplication engine 118 has previously processed, in the UID database 128 to identify duplicate variable sized data chunks in subsequent processing and to preclude storage of the duplicate variable sized data chunks in the chunk files 129. The deduplication engine 118 identifies the unique variable sized data chunks of each of the created variable sized data blocks by identifying a negative match between each generated UID of each of the variable sized data chunks of the created variable sized data blocks and the UIDs stored in the UID database 128. The deduplication engine 118 transmits the UIDs of each of the identified unique variable sized data chunks to the UID database 128 for storage in the UID database 128. The deduplication engine 118 queries the UID database 128 to determine whether the UID of the variable sized data chunk that the deduplication engine 118 is currently processing, is already available in the UID database 128. If the UID of the variable sized data chunk that the deduplication engine 118 is currently processing is already available in the UID database 128, the deduplication engine 118 identifies the current variable sized data chunk as a duplicate variable sized data chunk.

Consider an example where the variable sized splitter 115 splits a fixed sized data chunk 11011101 into four variable sized data chunks, for example, [110], [11], [1], and [01] and generates UIDs for these variable sized data chunks as UID1 for [110], UID2 for [11], UID3 for [1], and UID4 for [01]. Consider that the unique identifier (UID) database 128 has already stored UID3 of the variable sized data chunk [1] that was already identified as a unique variable sized data chunk and stored in the chunk files 129. Since UID3 has one duplicate instance, the deduplication engine 118 discards the variable sized data chunk [1] with the duplicate UID3, and transmits UID1, UID2, and UID4 to the UID database 128, while transmitting the variable sized data chunks [110], [11], and [01] identified as unique to the chunk files 129.

The deduplication engine 118 replaces each of the duplicate variable sized data chunks with a pointer to a unique instance of each of the duplicate variable sized data chunks, stored in the chunk files 129. As used herein, "unique instance of a duplicate variable sized data chunk" refers to a unique variable sized data chunk of which another variable sized data chunk of the data to be backed up, is a duplicate. The pointer comprises a location of storage of this unique instance in the chunk files 129. The deduplication engine 118 stores this pointer in the metadata of the duplicate variable sized data chunk as the location of the corresponding unique variable sized data chunk in the chunk files 129. The deduplication engine 118 identifies each of the duplicate variable sized data chunks by identifying a positive match between each generated unique identifier (UID) of each of the variable sized data chunks and the UIDs stored in the UID database 128. The deduplication engine 118 deletes, that is, discards the duplicate variable sized data chunks from the variable sized data blocks and transmits the metadata of the discarded duplicate variable sized data chunks along with the UIDs of the duplicate variable sized data chunks to the data writer 119 of the secure relational file system (SRFS) 100 exemplarily illustrated in FIG. 1. The data writer 119 implemented, for example, as a data processor and a write module, stores the metadata along with the UIDs of the duplicate variable sized data chunks in the metadata database 130.

The global, variable sized, block level, and inline deduplication technology of the secure relational file system (SRFS) 100 provides substantial data storage cost savings and extends the benefit of substantially reducing physical disk space requirements to users. The SRFS 100 is a scalable, custom file system that supports high performance deduplication in the context of backup, restore, and file sharing and collaboration use cases. The SRFS 100 is configured as a scalable, storage agnostic repository and implements live boot technology to mount and boot any disk image and any of its versions. Data deduplication is based on a principle of identifying data chunks, that is, blocks of bytes of duplicate data within files or raw disk images, and storing a single copy of that data chunk for each future reference. If a data chunk of the same characteristics exists in another file, for example, in a higher version of the same file, the SRFS 100 stores a pointer to the stored data chunk and, in turn, deletes the duplicate data chunk. The deduplication engine 118 of the SRFS 100 therefore detects identical blocks of data, removes redundant data, and inserts a pointer to existing data in the place of the redundant data whenever the deduplication engine 118 encounters the same blocks of data in other instances of a file. Data deduplication is therefore an optimization technique applied to storage resources for reducing the amount of storage needed. Data deduplication eliminates recurring data sets and ensures that a single unique instance of that data set is retained on storage media, for example, a physical disk, a network attached storage (NAS), or a storage area network (SAN). The deduplication engine 118 subsequently replaces any redundant data segments with a pointer to the existing unique data set retained in the storage media.

Data deduplication, depending on the type of algorithm used, operates on a variable sized chunk of data ranging from an entire physical file to an aggregated data block of bytes. The secure relational file system (SRFS) 100 processes the variable sized data chunk to create a unique identifier (UID) or a hash, also referred to as a digital signature of that variable sized data chunk being analysed. The SRFS 100 employs hash generation algorithms, for example, the secure hash algorithm 256 (SHA-256) for creating the UID. This UID is a key to the variable sized data chunk and is stored in an index or in an index database, for example, the UID database 128. The deduplication engine 118 stores the UIDs of the identified unique variable sized data chunks in the form of tables such as hash tables in the UID database 128. When the deduplication engine 118 analyses a variable sized chunk of new data, the deduplication engine 118 creates the UID for the variable sized chunk of new data and compares this UID with the existing UIDs stored in the UID database 128. Due to storage of the UIDs, the comparison of the created UID with the existing UIDs becomes efficient. In an embodiment, the deduplication engine 118 uses a filter, for example, a bloom filter for speeding up the database search and therefore the UID comparison. If the deduplication engine 118 finds a match for the created UID in the UID database 128, the deduplication engine 118 identifies the variable sized chunk of new data as a duplicate variable sized data chunk, and inserts a pointer to the original or the corresponding unique variable sized data chunk in the third metadata of the duplicate variable sized data chunk. If the deduplication engine 118 encounters the duplicate variable sized data chunk multiple times, then the deduplication engine 118 creates an equal number of pointers. Thus, the SRFS 100 does not store duplicate data and saves disk space by elimination of such redundancy.

Data deduplication typically occurs at a file level or a block level and involves use of either fixed sized data blocks or variable sized data blocks. In a file level deduplication, the secure relational file system (SRFS) 100 identifies differences between files by comparing two or more files and stores the unique versions of the compared files in one or more databases. File level deduplication suits the needs of archived systems where the files remain unchanged and are subjected to a cold storage for a substantial period of time. For a large number of scenarios in an enterprise landscape, where file changes occur, file level deduplication is ineffective in capturing the redundancies and improving storage efficiency. For example, in file level deduplication, a change of a single bit within documents, databases, multimedia files, or any other data formats, in effect, results in an entirely unique copy of that object and hence, the SRFS 100 designates this unique copy for additional storage. Deduplication is not possible at a level more granular than the entire file, making file level deduplication unsuitable for enterprise wide deployment.

Block level deduplication operates at a block level which is an aggregated set of bytes determined by specific algorithms. Block level deduplication offers an efficient elimination of redundant blocks of data that are substantially smaller in size than the original file size. In block level deduplication, the secure relational file system (SRFS) 100 splits an entire file into several blocks of data, referred herein as "data blocks", and then creates and compares the unique identifiers (UIDs) for these data blocks. In this way, the SRFS 100 transfers the data blocks that represent changed portions of a file instead of transferring an entire file. Smaller sized data blocks have a possibility of identifying matching data blocks and optimizing the data reduction in the storage. However, splitting the file into smaller sized data blocks in block level deduplication results in creation of a larger number of indexes for smaller sized data blocks and use of more computing resources to track the individual data blocks. The SRFS 100 performs block level deduplication using either the fixed sized data blocks or the variable sized data blocks. While performing the fixed sized data block level deduplication, the SRFS 100 predetermines a data block size and then segments the files and other entities into data blocks of that predetermined data block size defined, for example, by logical boundaries. While performing the variable sized data block level deduplication, the SRFS 100 determines the data block sizes depending on an inherent structure of the data, using finger printing algorithms, for example, the Rabin-Karp algorithm.

The compressor 120 of the secure relational file system (SRFS) 100 exemplarily illustrated in FIG. 1, compresses the unique variable sized data chunks for backup of the received data. The encryptor 121 of the SRFS 100 exemplarily illustrated in FIG. 1, encrypts the unique variable sized data chunks for backup of the received data. Thus, the SRFS 100 compresses and encrypts the unique, that is, distinct new variable sized data chunks and then transmits these compressed and encrypted unique variable sized data chunks along with the second metadata and the third metadata comprising the UIDs to the data writer 119. The SRFS 100 identifies, tracks, and compresses each of the unique variable sized data chunks. The SRFS 100 maintains a single compressed copy of each of the unique variable sized data chunks. In an embodiment, the deduplication engine 118 tracks identically segmented data chunks and then allows the compressor 120 to compress and the data writer 119 to store a single copy of the data chunks into the chunk files 129. While performing data deduplication, the deduplication engine 118 employs inline deduplication to increase performance speed of data deduplication. While performing inline deduplication, the deduplication engine 118 does not wait for the entire data to be written to a disk or for the entire backup process to be completed in order to commence the deduplication. As part of this inline deduplication, while the deduplication engine 118 processes a stream of variable sized data blocks for deduplication, the compressor 120 and the encryptor 121 compress and encrypt each of the deduplicated, unique variable sized data chunks respectively to ensure accumulative savings on the storage.

The data writer 119 stores 212 the identified unique variable sized data chunks in one or more of the chunk files 129 for backup and restore of the received data. The data writer 119 adds 213 a location of storage of each of the identified unique variable sized data chunks in the chunk files 129 to the generated third metadata. The data writer 119 stores 214 the generated first metadata comprising the file-to-sector mapping information, the generated second metadata extracted from each of the created variable sized data blocks, and the generated third metadata of each of the identified unique variable sized data chunks and each of the duplicate variable sized data chunks extracted from each of the created variable sized data blocks, in the metadata database 130 with minimal additional storage consumption for restore of the received data. This minimal additional storage is, for example, less than about 3% of the storage size of the backed up data. The storage reduction achieved by the secure relational file system (SRFS) 100 through deduplication of the received data prior to storing the backed up data compensates for this additional storage. On deduplication, the SRFS 100 stores the unique variable sized data chunks in the chunk files 129 and maintains the third metadata associated with each variable sized data chunk, that is, the unique variable sized data chunks and the duplicate variable sized data chunks in the metadata database 130.

The data writer 119 extracts additional metadata from each of the variable sized data blocks. For example, in the case of a disk image backup, the content in the variable sized data chunks is used in extracting file system information comprising, for example, master file table (MFT) details and master boot record (MBR) details used for creating the disk image. In the case of a file backup, the files are indexed using search servers such as Apache Solr of The Apache Software Foundation. The amount of metadata that can be extracted from the content is large and depends on the intelligence of the backup server, for example, the backup and data recovery (BDR) server 112 exemplarily illustrated in FIG. 1. The sophistication of the restores depends on the amount of metadata extracted and stored in the secure relational file system (SRFS) 100. The data writer 119 stores the extracted metadata along with the first metadata generated by the first metadata generation module 103 in the metadata database 130. The data writer 119 also stores the storage location of each of the unique variable sized data chunks in the chunk files 129, in the metadata database 130. The data writer 119 also stores, in the metadata database 130, the storage location of a unique instance of each of the duplicate variable sized data chunks to which the pointer points in the chunk files 129. The SRFS 100 uses the storage location of the unique instance to retrieve the duplicate variable sized data chunks during data restores. The SRFS 100 refers to the storage location of a unique counterpart, that is, a unique instance of the duplicate variable sized data chunks, in the chunk files 129, to retrieve the duplicate variable sized data chunks.

The integrity check performance module 122 of the secure relational file system (SRFS) 100 exemplarily illustrated in FIG. 1, performs an integrity check for rectifying errors in the identified unique variable sized data chunks by adding a parity file comprising, for example, parity information to the backed up data in each of the chunk files 129 where the identified unique variable sized data chunks are stored. In an embodiment, the SRFS 100 performs the integrity check for only the unique variable sized data chunks. However, since the duplicate variable sized data chunks refer to the corresponding unique variable sized data chunks, the SRFS 100 performs the integrity check for all the variable sized data chunks, unique and duplicate. The integrity check performance module 122 maintains information of the parity file in a backup file stored at one or more of multiple data restore levels for facilitating an integrity check at one or more data restore levels. The data restore levels comprise, for example, a disk image level, a chunk level, a repository level, a client level, and a backup level. Typical file systems fail to provide an inbuilt error control mechanism to the extent that the SRFS 100 provides. For example, native file systems such as new technology file systems (NTFSs) or fourth extended (ext4) file systems provide minimal hardware level error correction. The integrity check performance module 122 of the SRFS 100, on the other hand, builds a parity file for each chunk file. In an event of chunk file corruption, the integrity check performance module 122 uses the parity information in the parity file for fixing errors in the chunk file using various error correction techniques, for example, erasure coding.

The integrity check performance module 122 implements an inbuilt integrity check that detects and corrects multiple errors to preclude corruption of storage. The integrity check performance module 122 adds the parity file in the form of an additional redundancy to each of the stored unique variable sized data chunks using error correction codes such as the Reed-Solomon error correction codes. In an event of data corruption, the integrity check performance module 122 uses the parity information in the parity file for fixing errors in the file storage of the secure relational file system 100. The integrity check performance module 122 implements repository level inbuilt integrity verification to address corruption of backups.

The version control module 127 of the secure relational file system (SRFS) 100 exemplarily illustrated in FIG. 1, performs an incremental backup for maintaining data changed after each backup of the received data. For performing an incremental backup, the version control module 127 identifies changed unique variable sized data chunks and additional unique variable sized data chunks based on the logical boundaries obtained from the stored second metadata. The data writer 119, in communication with the version control module 127, stores the changed unique variable sized data chunks and the additional unique variable sized data chunks in one or more chunk files 129. The data writer 119 stores metadata of each of the changed unique variable sized data chunks and each of the additional unique variable sized data chunks in the metadata database 130 for allowing each incremental backup to be used instantly as a full backup, without merging with previous increments. During an incremental backup, the fixed sized data splitter 104 uses the logical boundaries that the fixed sized data splitter 104 used for splitting the received data into multiple fixed sized data chunks and the unique identifiers (UIDs) comprising a checksum of each of the split fixed sized data chunks, for a full backup or a first backup of the received data. The fixed sized data splitter 104 thus identifies the fixed sized data chunks that have changed since the previous backup. The data communication module 102 transmits only those fixed sized data blocks comprising the changed fixed sized data chunks to the version control module 127 of the backup and data recovery (BDR) server 112 exemplarily illustrated in FIG. 1. The BDR server 112 processes the fixed sized data blocks for the incremental backup in a way similar to processing the fixed sized data blocks for a full backup. In an embodiment, the version control module 127 identifies a version of the backup using the second metadata present in the fixed sized data blocks. The UIDs comprising checksums of the fixed sized data chunks in the second metadata are altered for subsequent versions of the backup. Thus, the version control module 127 identifies the version of the backup, for example, using the checksums of the fixed sized data chunks of the fixed sized data blocks.

The file backup, or the virtual machine (VM) backup, or the disk image backup is typically performed by archiving original data, also known as a full backup, followed by archiving changes made to the original data at each point in time, known as an incremental backup. The secure relational file system (SRFS) 100 stores the second metadata and the third metadata for each of these archives in the metadata database 130 such that each incremental backup is instantly available as a point in time full backup, for example, in the form of a view of the full data as the full data appeared when a full backup or an incremental backup was performed. The SRFS 100 stores this second metadata and the third metadata at minimal additional storage consumption. The SRFS 100 constructs the point in time full backup when needed. For example, if an application needs a part of full backup data corresponding to any of the incremental file versions, then the SRFS 100 instantly constructs that part of the full backup comprising incremental changes and provides the constructed part of the full backup data to the requesting application.

For performing the incremental backup, the version control module 127 receives fixed sized data blocks for the incremental backup from one or more client devices 101. The fixed sized data chunks in these received fixed sized data blocks are generated using the same logical boundaries as the previous version of the same backup. Use of the same logical boundaries as the previous version of the same backup enables identification of changed fixed size data blocks since the previous version of the backup. The received fixed size data blocks comprise changed fixed sized data blocks and/or additional fixed sized data blocks absent in the previous version of the same backup. The variable sized data splitter 115 of the secure relational file system (SRFS) 100 splits the fixed sized data chunks from each of the received fixed sized data blocks into multiple variable sized data chunks by introducing multiple context aware breakpoints in the fixed sized data chunks. The deduplication engine 118 deduplicates the variable sized data chunks. The data writer 119 stores the unique variable sized data chunks in the chunk files 129 and the metadata, for example, the second metadata extracted from each of the variable sized data blocks and the third metadata of the unique variable sized data chunks and the duplicate variable sized data chunks extracted from each of the variable sized data blocks in one or more databases, for example, the metadata database 130. Storage of the metadata allows each incremental backup to be used instantly as a full backup, without merging with previous increments. The SRFS 100 employs a backup chain architecture that addresses delays in granular restores and full restores from incremental backups.

Incremental data comprising changes with respect to a previous version of the same backup is treated as a separate version in a version control system. Data capture and metadata generation performed by the secure relational file system (SRFS) 100 provides support to multiple data restore use cases. The storage of metadata corresponding to each backup, an incremental of the backup for each data block received from a client device 101, and unique identifiers (UIDs) for each data block in the databases, for example, the UID database 128 and the metadata database 130 to enable instantaneous point in time data restores provides substantial flexibility for the underlying file system. During an incremental backup, the SRFS 100 stores the data blocks that have changed since the latest backup, similar to the versions in the version control system. Due to this incremental backup and metadata management that is flexible enough to expose the underlying data in multiple ways, the SRFS 100 exposes each incremental backup as a virtual full backup. Thus, a point in time full backup is available for each timestamp during which the SRFS 100 performed an incremental backup. Therefore, for restoration of a backup at any point in time or at any timestamp, the SRFS 100 does not require merging of previous changes or previous versions to a previous full backup. This supports numerous restore use cases such as instant boot of any version of the backup without merging of the versions with the full backup. The SRFS 100 performs multiple types of restores comprising, for example, mail level restores, a client level restore, etc., instantly on any of the incremental versions of the backup without requiring merging of the incremental versions with an initial original backup. The SRFS 100 also captures the file system metadata, for example, the master file table (MFT) in the case of the new technology file system (NTFS) to support restores of individual files or folders from any incremental backup at any point in time.

The secure relational file system (SRFS) 100 can be used to store any data, for example, a set of files and folders, disk images, virtual disk data, or data comprising, for example, sales and support data, electronic mail (email) data, social networking feeds such as data on twitter® of Twitter, Inc., bookmarks, etc., that applications such as customer relationship management applications generate, in a native file system. The SRFS 100 facilitates multiple interpretations for the stored data. For example, the SRFS 100 facilitates viewing of disk image data as virtual hard disk (VHD) files or virtual machine disk (VMDK) files or facilitates viewing these files stored inside the disk image data instantaneously. The SRFS 100 facilitates these multiple interpretations by storing the metadata associated with the backup in the databases, for example, the metadata database 130 and creating VHD data blocks or VMDK data blocks on demand from the unique variable sized data chunks stored in the chunk files 129.

FIG. 3 exemplarily illustrates a computer implemented method for restoring backup data. The computer implemented method disclosed herein employs the secure relational file system (SRFS) 100 comprising at least one processor, for example, processor 114 exemplarily illustrated in FIG. 1, configured to execute computer program instructions for restoring the backup data. The data reader 123 of the SRFS 100 exemplarily illustrated in FIG. 1, restores backup data. For restoring the backup data, the data reader 123 receives 301 the stored third metadata comprising the location of storage of each of the identified unique variable sized data chunks in the chunk files 129 and a pointer for each of the duplicate variable sized data chunks from one or more databases, for example, the metadata database 130 exemplarily illustrated in FIG. 1. The pointer points to a unique instance of each of the duplicate variable sized data chunks. This unique instance, that is, the unique variable sized data chunk to which a duplicate variable sized data chunk refers is stored in the chunk files 129. The data reader 123 retrieves 302 the identified unique variable sized data chunks from the chunk files 129 using the location of storage of each of the unique variable sized data chunks in the chunk files 129 from the received third metadata. The data reader 123 retrieves 303, from the chunk files 129, the unique instance of each of the duplicate variable sized data chunks, to which the pointer from the received third metadata points for retrieving each of the duplicate variable sized data chunks. A decryptor 125 of the SRFS 100 exemplarily illustrated in FIG. 1, decrypts each of the retrieved variable sized data chunks. A decompressor 126 of the SRFS 100 exemplarily illustrated in FIG. 1, decompresses each of the decrypted variable sized data chunks.

The data reader 123 receives 304 the stored second metadata comprising the logical boundaries that the fixed sized data splitter 104 used for splitting the received data into multiple fixed sized data chunks and the stored first metadata comprising the file-to-sector mapping information associated with disk storage of the received data in multiple sectors in the storage device, from the metadata database 130. The data assembler 124 exemplarily illustrated in FIG. 1, assembles 305 the retrieved unique variable sized data chunks and the retrieved unique instance of each of the duplicate variable sized data chunks in a predefined order, for example, using the logical boundaries in the received second metadata for regenerating and restoring each of the fixed sized data chunks using the received second metadata at a target location, for example, in the client device 101 exemplarily illustrated in FIG. 1, identified using the file-to-sector mapping information in the received first metadata. The data reader 123 receives information associated with the target location, that is, the client device 101 from the received first metadata comprising the file-to-sector mapping information that the first metadata generation module 103 of the secure relational file system (SRFS) 100 exemplarily illustrated in FIG. 1, generates on receiving a backup request comprising, for example, a request for a full backup or an incremental backup. Using this target location information and the logical boundaries from the received metadata, the data assembler 124 stores 306 the assembled or restored fixed sized data chunks in the identified target locations or renders the assembled fixed sized data chunks on the user interface 107 of the client device 101. Thus, a backup on a backup server, for example, the backup and data recovery (BDR) server 112 exemplarily illustrated in FIG. 1, can be restored using the SRFS 100.

During the restore, the data reader 123 implemented as a data reader and processor module of the secure relational file system (SRFS) 100 first queries the metadata database 130 to obtain a list of the variable sized data chunks comprising unique variable sized data chunks and duplicate variable sized data chunks that constitute the backup data. This list comprises, for example, third metadata of each of the unique variable sized data chunks that are stored in the chunk files 129 and third metadata of the duplicate variable sized data chunks that the deduplication engine 118 exemplarily illustrated in FIG. 1, has deleted during deduplication. The third metadata comprises the storage location of the unique variable sized data chunks in the chunk files 129. The third metadata further comprises pointers for the duplicate variable sized data chunks, pointing to unique counterparts or unique instances of the duplicate variable sized data chunks. The data reader 123 uses this information from the third metadata to retrieve the variable sized data chunks, that is, the unique variable sized data chunks and the duplicate variable sized data chunks. Once the variable sized data chunks are retrieved, decrypted, and decompressed, the data reader 123 transmits the variable sized data chunks to the data assembler 124, which restores, that is, writes the variable sized data chunks in a correct order into the target locations in the form of fixed sized data chunks using the first metadata and the second metadata from the metadata database 130.

Consider an example where a user of a client device 101 wishes to backup one of his/her disks of the client device 101, and store the backup on a server, for example, the backup and data recovery (BDR) server 112 exemplarily illustrated in FIG. 1. In this example, the client device 101 and the BDR server 112 are in communication over a network 111 exemplarily illustrated in FIG. 1, and employ the secure relational file system (SRFS) 100 for data backup and data restore. The user selects the disk that he/she wishes to backup via the user interface 107 of the client device 101 and provides this selection as an input to the data communication module 102 via the user interface 107. The data communication module 102 in turn transmits the user's request for backup to the data reader 106 and the first metadata generation module 103 of the SRFS 100 at the client device 101 for reading the data from the disk and generating first metadata associated with the backup of the disk respectively. Consider that the user selects DISK C for backup and DISK C comprises five sectors with each sector of a size of about 2 bytes. Also, consider DISK C comprises two files named FILE1 and FILE2. The first file FILE1 is stored in sector 1 of DISK C and comprises 1110101001110010. The second file FILE2 is stored in sector 2 of DISK C and comprises 1111011001101100.

The first metadata generation module 103 generates the first metadata associated with the backup and transmits the generated first metadata to the data communication module 102, which in turn transmits the generated first metadata to the backup and data recovery (BDR) server 112 for establishing a handshake between the client device 101 and the BDR server 112 for initiating the data backup from the files FILE1 and FILE2. The first metadata comprises a name of the client device 101, CLIENT1, that is a unique identification of the client device 101 such as a machine name or a medium access control (MAC) address of the client device 101, a backup name BACKUP1 that the users use to uniquely identify the backup, the used sector information 11000 that indicates that the first two out of five sectors are used sectors, etc. The generated first metadata further comprises the list of files FILE1 and FILE2 and file attribute information, the file-to-sector mapping information, the file sizes, for example, 2 bytes each, the file permissions, etc. The more information added about the files to the first metadata, the more flexibility the secure relational file system (SRFS) 100 provides in interpreting the disk image content. For example, if the SRFS 100 has contents of the files, that are indexed, and the first metadata associated with the backup of the files, then the SRFS 100 can search within the files without having to restore the entire disk image or even the files. The data communication module 102 receives this first metadata from the first metadata generation module 103 and transmits this first metadata to the BDR server 112 over the network 111 for a data restore.

The data reader 106 reads the first two used sectors of DISK C and transmits the data read from the FILE1 and the FILE2 to the fixed sized data splitter 104. The fixed sized data splitter 104 splits the received data into multiple fixed sized data chunks (FSDCs) using the first metadata comprising, for example, information associated with contents of each of the files. Consider that the fixed sized data splitter 104 uses a logical boundary of a length of, for example, 8 bits or 1 byte for splitting the received data into the FSDCs comprising, for example, FSDC1=11101010, FSDC2=01110010, FSDC3=11110110, and FSDC4=01101100. The second metadata generation module 105 of the SRFS 100 generates second metadata MD21, MD22, MD23, and MD24 for each of the FSDCs. The second metadata comprises, for example, the logical boundaries of each of the FSDCs, that is, 8 bits, and a unique identifier (UID) for each FSDC. The UID is a checksum of the content in each FSDC. The SRFS 100 uses the UIDs and the logical boundaries to identify the changed FSDCs while performing an incremental backup. The fixed sized data splitter 104 creates multiple fixed sized data blocks (FSDBs) by prepending the generated second metadata to the FSDCs. Therefore, the FSDBs comprise, for example, FSDB1= [MD21, 11101010], FSDB2=[MD22, 01110010], FSDB3= [MD23, 11110110], and FSDB4=[MD24, 01101100]. The data communication module 102 transmits each of the created FSDBs to the variable sized data splitter 115 of the backup and data recovery (BDR) server 112. The variable sized data splitter 115 generates multiple context aware breakpoints in the FSDCs of each of the received FSDBs, for splitting the FSDCs into multiple variable sized data chunks (VSDCs). The variable sized data splitter 115 splits the FSDBs as follows:

FILE1:
FSDB1=[MD21, 11101010] is split into VSDBs, for example, VSDB1=[MD21, 111] and VSDB2=[MD21, 01010], where VSDC1=[111] and VSDC2=[01010]; and
The FSDB2=[MD22, 01110010] is split into VSDBs, for example, VSDB3=[MD22, 0], VSDB4=[MD22, 111], and VSDB5=[MD22, 0010], where VSDC3=[0], VSDC4= [111], and VSDC5=[0010]

FILE2:
FSDB3=[MD23, 11110110] is split into VSDBs, for example, VSDB6=[MD23, 111] and VSDB7=[MD23, 10110], where VSDC6=[111] and VSDC7=[10110]; and FSDB4=[MD24, 01101100] is split into VSDBs, for example, VSDB8=[MD24, 01], VSDB9=[MD24, 10110], and VSDB10=[MD24, 0], where VSDC8=[01], VSDC9= [10110], and VSDC10=[0].

The unique identifier (UID) generator 116 of the backup and data recovery (BDR) server 112 exemplarily illustrated in FIG. 1, generates a UID for each of the variable sized data chunks (VSDCs). The UID is generated for each of the VSDCs comprising, for example, [111], [01010], [0], [111], [0010], [111], [10110], [01], [10110], and [0], and not for the second metadata MD21, MD22, MD23, and MD24. The UIDs are the same for the VSDCs containing the same data. The generated UIDs comprise, for example, UID1 for [111], UID2 for [01010], UID3 for [0], UID4 for [0010], UID5 for [10110], and UID6 for [01]. The third metadata generation module 117 of the BDR server 112 generates third metadata comprising the generated UIDs and data associated with the backup comprising data of a file system used for storing the received data and an index of contents of the VSDCs. The variable sized data splitter 115 creates multiple variable sized data blocks (VSDBs) by prepending the generated second metadata comprising the logical boundaries and the checksums of the fixed sized data chunks and the generated third metadata comprising the UIDs of the VSDCs and the data associated with the backup, to the VSDCs. The variable sized data splitter 115 creates the VSDBs as follows:

FILE1:
VSDB1=[MD21, MD31(UID1), 111],
VSDB2=[MD21, MD32(UID2), 01010],
VSDB3=[MD22, MD33(UID3), 0],
VSDB4=[MD22, MD34(UID1), 111],
VSDB5=[MD22, MD35(UID4), 0010],
FILE2:
VSDB6=[MD23, MD36(UID1), 111],
VSDB7=[MD23, MD37(UID5), 10110],
VSDB8=[MD24, MD38(UID6), 01],
VSDB9=[MD24, MD39(UID5), 10110], and
VSDB10=[MD24, MD310(UID3), 0].

The deduplication engine 118 of the backup and data recovery (BDR) server 112 identifies unique variable sized data chunks (VSDCs) of each of the created variable sized data blocks (VSDBs) using each generated UID from the generated third metadata in communication with the UID database 128 for deduplication of the VSDCs. The UID database 128 comprises UIDs of the unique VSDCs that the deduplication engine 118 has previously processed. The deduplication engine 118 processes the VSDCs in the order in which the deduplication engine 118 receives the VSDCs from the variable sized data splitter 115 and stores the UIDs of the unique VSDCs in the UID database 128. Consider that the blocks VSDB1, VSDB2, and VSDB3 mentioned above arrive at a particular time instant together at the deduplication engine 118. The deduplication engine 118 identifies the VSDCs VSDC1, VSDC2, and VSDC3 of the VSDBs VSDB1, VSDB2, and VSDB3 respectively as unique VSDCs and stores the UIDs UID1, UID2, and UID3 of these unique VSDCs in the UID database 128. When the next block VSDB4 arrives at the deduplication engine 118, the deduplication engine 118 queries the UID database 128 to determine whether the VSDC4 of the VSDB4 is unique or duplicate. The UID database 128 already has UID1 stored for the unique VSDC1 and therefore the deduplication engine 118 discards the VSDC4. Similarly, the deduplication engine 118 identifies VSDC6, VSDC9, and VSDC10 to be duplicate VSDCs of VSDC1, VSDC7, and VSDC3 respectively. The deduplication engine 118 discards the duplicate VSDCs VSDC4, VSDC6, VSDC9, and VSDC10 and replaces the discarded VSDCs with a pointer pointing to a unique instance of each of the duplicate VSDCs, that is, to the unique VSDCs VSDC1, VSDC7, and VSDC3. The pointers are stored in the third metadata MD34, MD36, MD39, and MD310 of the duplicate VSDCs VSDC4, VSDC6, VSDC9, and VSDC10.

After processing the last variable sized data block VSDB10, the deduplication engine 118 identifies the variable sized data chunks (VSDCs) VSDC1, VSDC2, VSDC3, VSDC5, VSDC7, and VSDC8 to be unique VSDCs. The deduplication engine 118 therefore stores the unique identifiers (UIDs) UID1, UID2, UID3, UID4, UID5, and UID6 for the identified unique VSDCs in the UID database 128 for subsequent deduplication of VSDCs. The data writer 119 of the backup and data recovery (BDR) server 112 exemplarily illustrated in FIG. 1, receives the UIDs, for example, UID1, UID2, UID3, UID4, UID5, and UID6, and the third metadata, for example, MD34, MD36, MD39, and MD310 of each of the duplicate VSDCs VSDC4, VSDC6, VSDC9, and VSDC10 from the deduplication engine 118 and stores the received UIDs and the third metadata in the metadata database 130 of the BDR server 112. The compressor 120 and the encryptor 121 exemplarily illustrated in FIG. 1, compress and encrypt each of the unique VSDCs VSDC1, VSDC2, VSDC3, VSDC5, VSDC7, and VSDC8 respectively. The data writer 119 stores the compressed and encrypted unique VSDCs in the chunk files 129 of the BDR server 112. The data writer 119 adds a location of storage of each of the identified unique VSDCs in the chunk files 129 to the third metadata MD31, MD32, MD33, MD35, MD37, and MD38 of the unique VSDCs VSDC1, VSDC2, VSDC3, VSDC5, VSDC7, and VSDC8 respectively. The data writer 119 stores the first metadata, the second metadata MD21, MD22, MD23, and MD24 extracted from each of the VSDBs, and the third metadata MD31, MD32, MD33, MD34, MD35, MD36, MD37, MD38, MD39, and MD310 of the identified unique VSDCs and the duplicate VSDCs in the metadata database 130. The stored third metadata MD34, MD36, MD39, and MD310 of the duplicate VSDCs VSDC4, VSDC6, VSDC9, and VSDC10 respectively, comprises pointers pointing to the storage locations of the unique counterparts or the unique instances VSDC1, VSDC7, and VSDC3 in the chunk files 129, where MD34 comprises a pointer to the storage location of VSDC1, MD36 comprises a pointer to the storage location of VSDC1, MD39 comprises a pointer to the storage location of VSDC7, and MD310 comprises a pointer to the storage location of VSDC3.

Consider another example where a user wishes to restore a file, for example, FILE2 stored in sector 2 of the disk DISK C that the secure relational file system (SRFS) 100 has backed up. The data reader 123 receives the third metadata, for example, MD37 and MD38 comprising a location of storage of each of the unique variable sized data chunks (VSDCs) VSDC7 and VSDC8 in the chunk files 129 and pointers stored in the third metadata MD36, MD39, and MD310 for the duplicate VSDCs VSDC6, VSDC9, and VSDC10 respectively, from the metadata database 130. The pointers point to the storage locations of the unique instances of the duplicate variable sized data chunks (VSDCs), in the chunk files 129. The storage locations of these unique instances in the chunk files 129 are stored in the metadata database 130. The data reader 123 retrieves the unique VSDCs VSDC7 and VSDC8 and the unique instances for the duplicate VSDCs VSDC6, VSDC9, and VSDC10 from the chunk files 129 using the VSDC storage locations obtained from the received third metadata. The decryptor 125 and the decompressor 126 of the backup and data recovery (BDR) server 112 exemplarily illustrated in FIG. 1, decrypt and decompress each of the retrieved VSDCs. The data reader 123 also receives the stored second metadata, for example, MD23 and MD24 associated with the variable sized data blocks (VSDBs) VSDB6, VSDB7, VSDB8, VSDB9, and VSDB10 from the metadata database 130 and the stored first metadata. The data assembler 124 of the BDR server 112 assembles the decrypted and decompressed unique VSDCs and duplicate VSDCs in a predefined order using the received second metadata, for example, logical boundaries, for regenerating and restoring the fixed sized data chunks (FSDCs) FSDC3 and FSDC4 of the fixed sized data blocks (FSDBs) FSDB3 and FSDB4 using the received second metadata at a target location identified using the received first metadata. The data assembler 124 retrieves information about the target location from the first metadata associated with the backup comprising client name CLIENT1, that is, the user's client device 101 for rendering the restored data string of FILE2 in an original order to the user.

For every incremental backup that a user wishes to perform for the data in his/her files, the version control module 127 of the backup and data recovery (BDR) server 112 maintains data changed after each backup of the received data by identifying and storing changed unique variable sized data chunks (VSDCs) and additional unique VSDCs in the chunk files 129 based on the logical boundaries obtained from the stored second metadata in the metadata database 130. Consider that the content of FILE2 was modified from 1111011001101100 to 1111011001110010. The data reader 106 at the client device 101 reads only the changed sectors which is sector 2 corresponding to the storage of FILE2 and transmits this data to the fixed sized data splitter 104. The fixed sized data splitter 104 on the client device 101 uses the same logical boundary=8 bits for splitting this changed data string, therefore generating fixed sized data chunks (FSDCs), for example, FSDC11=11110110 and FSDC12=01110010, corresponding to the first full backup of the disk image backup BACKUP1. The fixed sized data splitter 104 compares the unique identifiers (UIDs) comprising checksums of these FSDCs with those of the FSDCs generated before and identifies that FSDC4=01101100 has changed from FSDC4 to FSDC12, while FSDC3=11110110 remains the same as FSDC11. The data communication module 102 transmits only a single fixed sized data block (FSDB) created using this changed FSDC12 to the variable sized data splitter 115 of the BDR server 112 over the network 111. The secure relational file system (SRFS) 100 then processes only the changed FSDB12 and backs up the unique VSDCs generated from this changed FSDB12 in the chunk files 129. In this example, the variable sized data splitter 115 splits FSDC12 into VSDC12=[0], VSDC13=[111], and VSDC14=[0010]. The deduplication engine 118 generates and compares the UIDs of these VSDCs with the previously generated UIDs stored in the UID database 128. Since all of these VSDCs are duplicate chunks, the deduplication engine 118 discards these VSDCs, replaces the discarded VSDCs with pointers, and stores the second metadata comprising the logical boundaries that the second metadata generation module 105 generated, and the third metadata comprising the pointers, the UIDs, and the backup data that the third metadata generation module 117 generated for each of the discarded VSDCs, in the metadata database 130 for facilitating each incremental backup to be used instantly as a full backup, without merging with previous increments.

For mail level restores, for example, granular mail level restores from electronic mail (email) archives, if a physical server or a virtual server has an exchange server installed, then a backup and data recovery (BDR) application or a backup and disaster recovery application backs up an image of the physical server or the virtual server, ensuring that a disk snapshot of the backup image has a consistent exchange database (EDB). The BDR application maintains a consistent EDB for every incremental image. Consider an example where the BDR application backs up one full image followed by 25 incremental backups over a period of time. If a backup server for the BDR application uses the secure relational file system (SRFS) 100 for data storage, the SRFS 100 enables an administrator to select the $20^{th}$ incremental backup from a specific point in time and mount the disk snapshot at that point. The versioning of the backup and the metadata management in the SRFS 100 facilitates this point in time backup and restore. The EDB in the disk snapshot will now be available as a full EDB file at that point in time. This virtual EDB can now be used to recover individual emails from the disk image backup to support the use case of the mail level restores. Thus, the SRFS 100 implements the use case of mail level restores without merging the full image with 20 previous incremental backups and constructing the virtual hard disk (VHD) for mounting the disk snapshot. The SRFS 100 exposes a VHD mount for the $20^{th}$ incremental backup instantaneously, thereby making available a virtual full exchange database at that point in time. Similar to the exchange server, the SRFS 100 uses the SharePoint® web application platform of Microsoft Corporation to support the document level restores, and the SQL server® of Microsoft Corporation to support the table level restores.

The secure relational file system (SRFS) 100 makes the use case of a reverse incremental backup redundant. The reverse incremental backup ensures a latest incremental backup is always kept as a full backup so that the latest incremental backup is mountable and bootable. Most products expend the central processing unit (CPU) and storage to merge the latest incremental backup with the previous incremental backups to maintain a full backup image in the virtual hard disk (VHD) or the virtual machine disk (VMDK). Instead, the SRFS 100 stores versioning information of each of the variable sized data chunks (VSDCs) for a full backup and an incremental backup in the databases, for example, the metadata database 130 along with the storage location of each of the unique VSDCs in the chunk files 129. The SRFS 100 ensures that every incremental backup is made available as a full backup instantaneously. To retrieve a particular version of a backup, the SRFS 100 queries the metadata database 130 to receive a list of variable sized data blocks (VSDBs) that are to be assembled to construct the full image of the backup at that point of time. Thus, the SRFS 100 eliminates the need for merging or consolidating previous incremental backups, thereby saving time spent during data restores and eliminating the need to plan for additional data storage. Moreover, the SRFS 100 facilitates a restore of any version of a disk image backup in any image file format comprising, for example, raw sector data, virtual hard disk (VHD) format, virtual machine disk (VMDK) format, virtual disk image (VDI) format, etc., without any processing or merging of incremental versions with the full backup.

The secure relational file system (SRFS) 100 disclosed herein stores the metadata of the archived files and folders in the metadata database 130, for example, the MySQL® database developed by MySQL AB Company, mongoDB® of MongoDB, Inc., etc., to provide substantial flexibility in interpreting data to the underlying file system and expediting metadata reads and metadata writes. Due to storage of the metadata in the metadata database 130, applications can interpret underlying data in multiple ways based on a query that runs on the stored metadata. For the disk image backup and the virtual machine (VM) backup, in addition to storing information about the disk, the SRFS 100 reads the metadata of the file system used in creating the disk, and stores the metadata of the file system used in creating the disk, that is, the first metadata, along with the second metadata and the third metadata of the SRFS 100. Storing the first metadata, the second metadata, and the third metadata enables multiple applications to interpret the archived data in their respective ways. For example, the SRFS 100 can use the file system information of a disk image backup to restore an individual file stored as part of the disk image backup without restoring the entire disk image backup.

In an embodiment, during the backup of the received data, the secure relational file system (SRFS) 100 separates data present in backup files or an image from bookkeeping associated with the data, that is, from the metadata associated with the data. The SRFS 100 then stores the separated data in the form of data blocks after deduplication of the data. The SRFS 100 separately stores the metadata in the metadata database 130, in a way that is agnostic to the file system of the backup. Therefore, the SRFS 100 is a file system of file systems. This type of storage enables a backup application to instantly associate the data in the SRFS 100 to any file system metadata, thereby facilitating on demand file restores or image restores in multiple file formats and addressing use cases in the backup and recovery domain and other domains such as big data analytics that involves semantic searches and analytics of the backed up data. The SRFS 100 captures, generates, and stores the metadata for seamlessly supporting multiple use cases related to backup and restore of the received data.

In the case of backup of physical server images and virtual server images using applications comprising, for example, VMware® of VMware, Inc., Hyper-V® of Microsoft Corporation, Xen® developed by XenSource, Inc., etc., the secure relational file system (SRFS) 100 does not consider the source of these images. The SRFS 100 treats these images equally, extracts raw data from these images, and splits and stores the images at a block level after deduplication. Similarly, during an incremental backup, the SRFS 100 treats the images equally, extracts raw data from these images, and splits and stores the images at a block level after deduplication. The SRFS 100 stores the images in a format that allows the images to be seamlessly tied to use cases, for example, by obtaining a file in a virtual hard disk (VHD) format or a virtual machine disk (VMDK) format during restores. The applications comprising, for example, the VMware ESXi Server of VMware, Inc., HyperV®, Windows® Disk Management, or a third party application that consumes these formats can work with the images as if each image is a file in a regular file system. Hence, any of the backed up server images is available in multiple formats without any additional storage. For example, the SRFS 100 could restore a physical server image on an ESXi server of VMware, Inc., or an ESXi image on a physical server. The SRFS 100 implements multiple use cases comprising, for example, mail level restores, document level restores, table level restores, integrity checks, a reverse incremental backup for an instant mount or an instant boot of a latest backup, big data analytics, etc.

Another use case is the integrity checks that the secure relational file system (SRFS) 100 performs for restores of every incremental backup to ensure there is no error during the incremental backup. The SRFS 100 enables performance of a mount test, a boot test, and runs an integrity check on restores of every incremental backup and restore, without merging previous incremental backups and creating a full backup. The SRFS 100 ensures completion of every incremental backup and restore without any corruption.

The secure relational file system (SRFS) 100 facilitates advanced content searching and sharing. The SRFS 100 supports instant viewing of any version of the data stored using the SRFS 100 because of the versioning and the metadata management of the SRFS 100. Consider an example where a user from an organization backs up his/her disk image everyday using incremental disk image backups into the SRFS 100. The SRFS 100 allows the user to restore any version of any of the files or the folders inside his/her disk image without having to merge with previous increments or restore any of the previous increments. The user may use this option to download or instantly share older versions of his/her project files that reside in the disk image with other people. The SRFS 100 has versioning capabilities similar to those of the Git® distributed version control system of Software Freedom Conservancy, Inc., or subversion (SVN) and facilitates an instant editing of the content and storage of the content as a separate version. Furthermore, if the content stored in the SRFS 100 is indexed using a search server such as Apache Solr that is based on the Lucene® search engine library of The Apache Software Foundation, the SRFS 100 can store the content in the metadata database 130, which can then be used to provide a content searching feature on all the versions of the data. A backup server with the SRFS 100 hosted in a cloud infrastructure having such features provides support for various applications, for example, content sharing, instant booting of the disk image or a virtual machine (VM) backup, online editing of contents, etc.

Disclosed herein is also a computer program product comprising a non-transitory computer readable storage medium storing computer program codes that comprise instructions executable by at least one processor 108 or 111 exemplarily illustrated in FIG. 1, for storing data and managing changes to the data in a storage device for backup and restore. The computer program product disclosed herein comprises a first computer program code for receiving data for backup and restore; a second computer program code for generating first metadata associated with the received data for backup; a third computer program code for splitting the received data into multiple fixed sized data chunks using the generated first metadata; a fourth computer program code for generating second metadata for each of the fixed sized data chunks for restore of the received data; a fifth computer program code for creating multiple fixed sized data blocks by prepending the generated second metadata to the fixed sized data chunks; a sixth computer program code for splitting fixed sized data chunks of each of the created fixed sized data blocks into multiple variable sized data chunks using multiple context aware breakpoints in the fixed sized data chunks; a seventh computer program code for generating a unique identifier (UID) for each of the variable sized data chunks; an eighth computer program code for generating third metadata for each of the variable sized data chunks; a ninth computer program code for creating multiple variable sized data blocks by prepending the generated third metadata of each of the variable sized data chunks and the generated second metadata from each of the created fixed sized data blocks to each of the variable sized data chunks; a tenth computer program code for identifying unique variable sized data chunks of the created variable sized data blocks using each generated unique identifier from the generated third metadata, in communication with one or more databases, for example, the UID database 128, for deduplication of the variable sized data chunks; an eleventh computer program code for storing the identified unique variable sized data chunks in one or more chunk files 129 exemplarily illustrated in FIG. 1, for backup and restore of the received data; a twelfth computer program code for adding a location of storage of each of the identified unique variable sized data chunks in the chunk files 129 to the generated third metadata; and a thirteenth computer program code for storing the generated first metadata, the generated second metadata extracted from each of the created variable sized data blocks, and the generated third metadata of the identified unique variable sized data chunks and duplicate variable sized data chunks extracted from each of the created variable sized data blocks, in one or more databases, for example, the metadata database 130 exemplarily illustrated in FIG. 1, with minimum additional storage consumption for the restore of the received data.

The computer program product further comprises a fourteenth computer program code for performing an integrity check for rectifying errors in the identified unique variable sized data chunks by adding a parity file to each of the chunk files 129 where the identified unique variable sized data chunks are stored. The computer program product further comprises a fifteenth computer program code for maintaining information of the parity file in a backup file stored at one or more of multiple data restore levels for facilitating the integrity check at one or more of the data restore levels comprising, for example, a disk image level, a chunk level, a repository level, a client level, and a backup level. The computer program product further comprises a sixteenth computer program code for receiving the stored third metadata comprising the location of storage of each of the identified unique variable sized data chunks in the chunk files 129 and a pointer for each of the duplicate variable sized data chunks from one or more databases, for example, the metadata database 130; a seventeenth computer program code for retrieving the identified unique variable sized data chunks from the chunk files 129 using the location of storage of each of the identified unique variable sized data chunks in the chunk files 129 from the received third metadata; an eighteenth computer program code for retrieving, from the chunk files 129, the unique instance of each of the duplicate variable sized data chunks, to which the pointer from the received third metadata points, for retrieving each of the duplicate variable sized data chunks; a nineteenth computer program code for receiving the stored second metadata comprising the logical boundaries used for splitting the received data into fixed sized data chunks and the stored first metadata comprising the file-to-sector mapping information from one or more databases, for example, the metadata database 130; a twentieth computer program code for assembling the retrieved unique variable sized data chunks and the retrieved unique instance of each of the duplicate variable sized data chunks in a predefined order using the received second metadata for regenerating and restoring the fixed sized data chunks using the received second metadata at a target location identified using the received first metadata. The computer program product further comprises a twenty first computer program code for performing an incremental backup for maintaining data changed after each backup of the received data. The twenty first computer program code comprises a twenty second computer program code for storing metadata of each of the changed unique variable sized data chunks and each of the additional unique variable sized data chunks in one or more databases, for example, the metadata database 130, for allowing each incremental backup to be used instantly as a full backup, without merging with previous increments.

The computer program product disclosed herein further comprises one or more additional computer program codes for performing additional steps that may be required and contemplated for storing data and managing changes to the data in a storage device for backup and restore. In an embodiment, a single piece of computer program code comprising computer executable instructions performs one or more steps of the computer implemented method disclosed herein for storing data and managing changes to the data in a storage device for backup and restore. The computer program codes comprising computer executable instructions are embodied on the non-transitory computer readable storage medium. The processors 108 and 111 of the secure relational file system (SRFS) 100 retrieve these computer executable instructions and execute them. When the computer executable instructions are executed by the processors 108 and 111, the computer executable instructions cause the processors 108 and 111 to perform the steps of the computer implemented method for storing data and managing changes to the data in a storage device for backup and restore.

Figure 4:
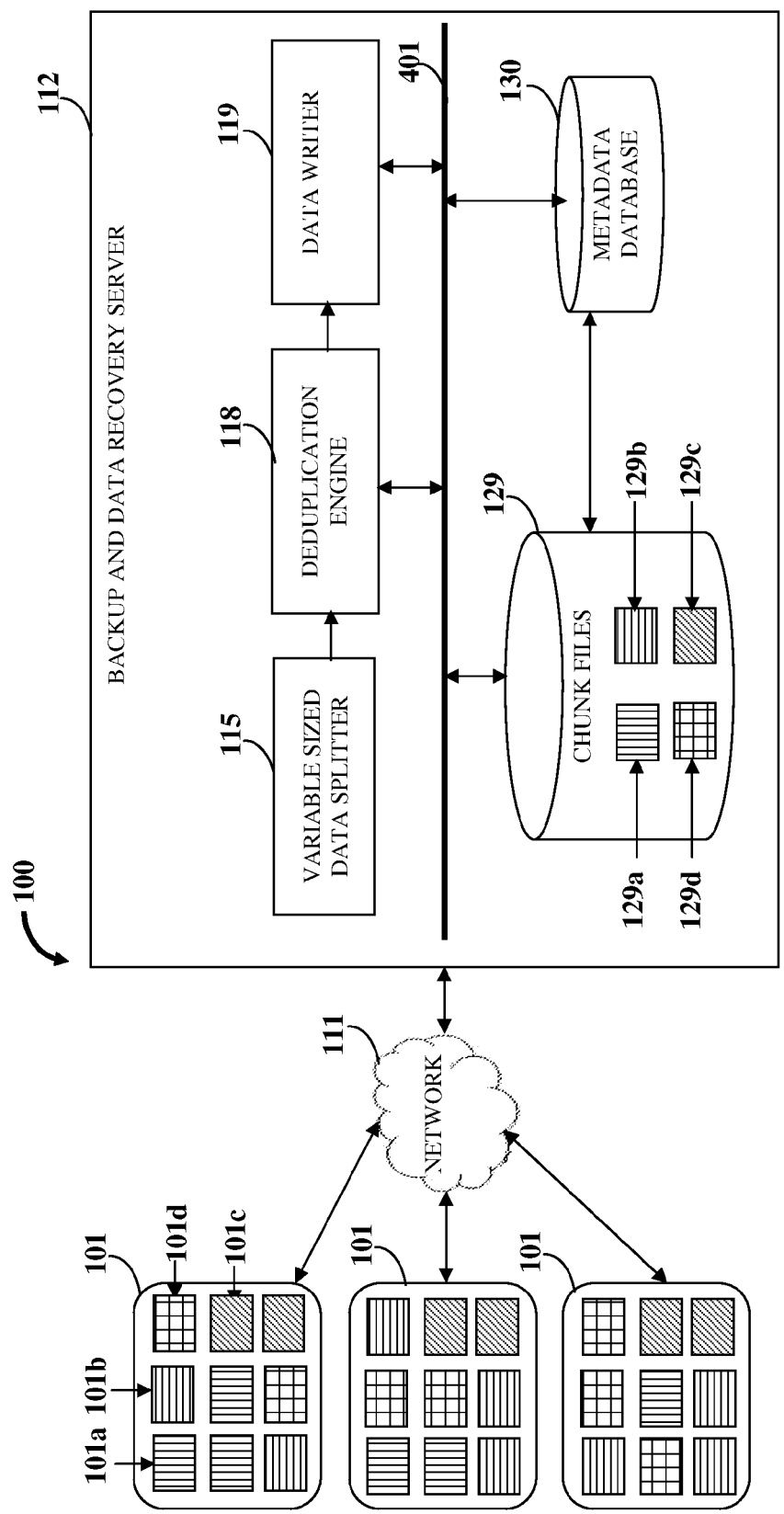
FIG. 4 exemplarily illustrates the secure relational file system performing deduplication of data for storing data and managing changes to the data in a storage device for backup and restore.

FIG. 4 exemplarily illustrates the secure relational file system (SRFS) 100 performing deduplication of data for storing the data and managing changes to the data in a storage device for backup and restore. The SRFS 100 comprises the backup and data recovery (BDR) server 112 accessible by one or more client devices 101 via a network 111, for example, a local area network (LAN), a wide area network (WAN), etc. As exemplarily illustrated in FIG. 4, the BDR server 112 comprises the variable sized data splitter 115, the deduplication engine 118, the data writer 119, the chunk files 129 for storing the deduplicated data, and the metadata database 130 for storing metadata associated with the data to be backed up. The variable sized data splitter 115, the deduplication engine 118, and the data writer 119 are in communication with the chunk files 129 and the metadata database 130 via a data bus 401. The data bus 401 permits communications between the modules comprising, for example, 115, 118, 119, 129, 130, etc., of the SRFS 100. FIG. 4 exemplarily illustrates the operation of the SRFS 100 while performing a data backup. For backup, for example, a file backup, a disk image backup, or a virtual machine (VM) backup of data residing on the client devices 101, backup data or archived data of the client devices 101 is split into fixed sized data blocks 101a, 101b, 101c, and 101d. The client devices 101 transmit the fixed sized data blocks 101a, 101b, 101c, and 101d to the BDR server 112 over the network 111.

The secure relational file system (SRFS) 100 aggregates the fixed sized data blocks 101a, 101b, 101c, and 101d in the BDR server 112 and sends the fixed sized data blocks 101a, 101b, 101c, and 101d through the variable sized data splitter 115. The variable sized data splitter 115, for example, a Rabin-Karp fingerprint splitter splits the fixed sized data chunks of each of the fixed sized data blocks 101a, 101b, 101c, and 101d into multiple variable sized data chunks. The unique identifier (UID) generator 116 exemplarily illustrated in FIG. 1, generates UIDs, for example, fingerprints or hashes, for each variable sized data chunk. A hash or a fingerprint is a unique identification for a data chunk. The SRFS 100 feeds each of these variable sized data chunks to the deduplication engine 118 that identifies the unique variable sized data chunks by deduplicating the variable sized data chunks of the variable sized data blocks. The deduplication engine 118 uses the hashes, that is, the UIDs of the variable sized data chunks for identifying duplicate variable sized data chunks from among the variable sized data chunks. The data writer 119 stores metadata corresponding to each variable sized data chunk that is unique or duplicate in the metadata database 130. The deduplication engine 118 compares the UID or hash of each variable sized data chunk with the UIDs or hashes of previous variable sized data chunks, stored in the UID database 128. The deduplication engine 118 stores the UIDs or hashes of previously analysed unique variable sized data chunks in the UID database 128. The deduplication engine 118 captures the unique variable sized data chunks instructs the data writer 119 to store the unique variable sized data chunks 129a, 129b, 129c, and 129d into the chunk files 129.

The secure relational file system (SRFS) 100 maintains logical boundaries of the fixed sized data chunks of the fixed sized data blocks 101a, 101b, 101c, and 101d and the variable sized data chunks each time a backup is performed. In an embodiment, the SRFS 100 maintains logical boundaries of the fixed sized data chunks of the fixed sized data blocks 101a, 101b, 101c, and 101d and the variable sized data blocks at the client devices 101. During an incremental backup which involves a backup at different timestamps to account for changes, the SRFS 100 maintains only data chunks that have changed since the previous backup. The SRFS 100 stores metadata of each of the changed fixed sized data chunks in the metadata database 130 to allow every incremental backup to be used instantly as a full backup at any point in time, without merging the latest incremental backup with previous incremental backups. While the SRFS 100 stores only the identified unique variable sized data chunks in the chunk files 129, the SRFS 100 maintains the metadata of each of the unique and duplicate variable sized data chunks in the metadata database 130.

Figure 5:
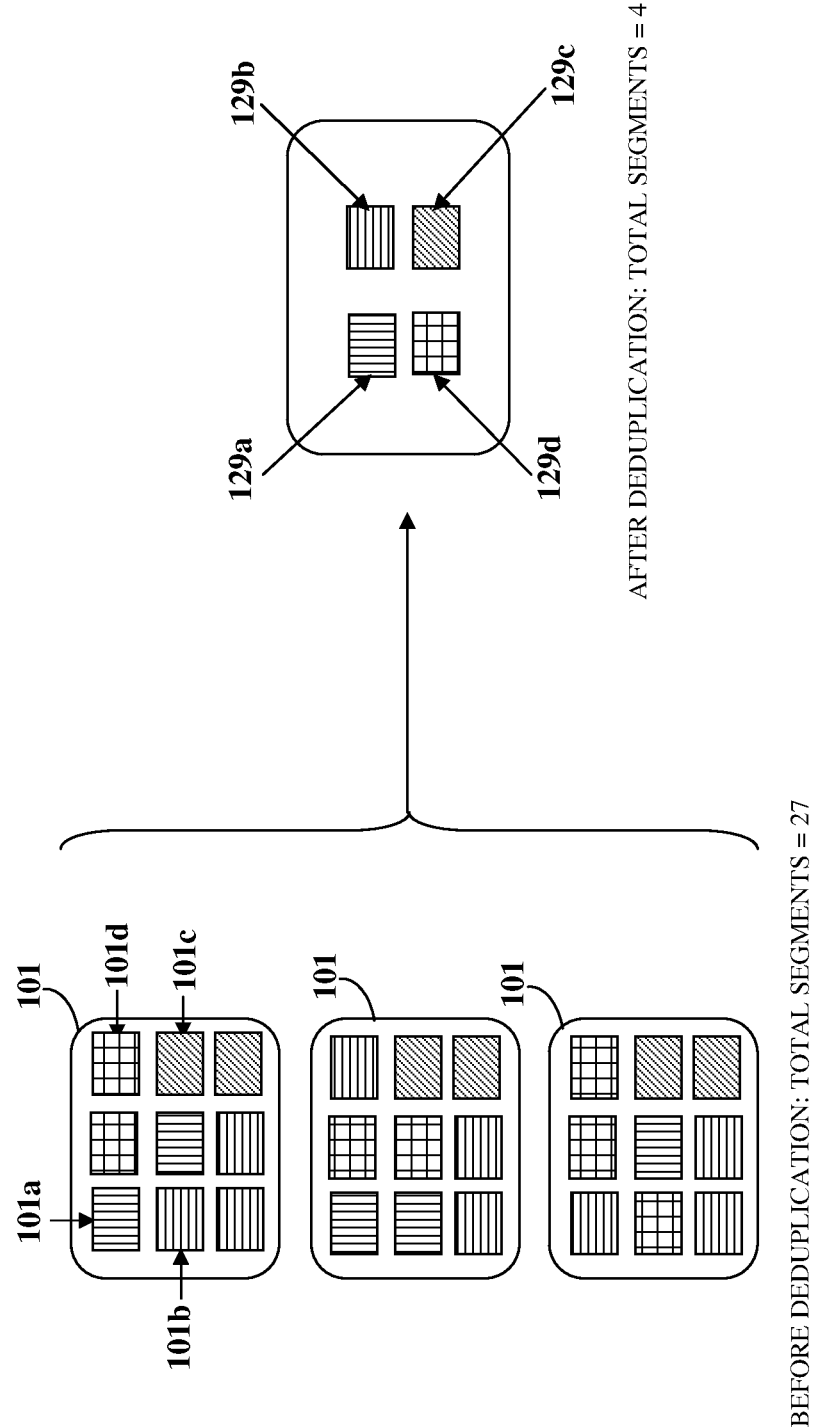
FIG. 5 exemplarily illustrates deduplication of data in a storage device for reducing size of storage.

FIG. 5 exemplarily illustrates deduplication of data in a storage device for reducing size of storage. The secure relational file system (SRFS) 100 exemplarily illustrated in FIG. 1, implements target based global deduplication. In target based global deduplication, the SRFS 100 performs the deduplication at a destination end of a backup process. For example, the SRFS 100 performs the data processing required for removing redundancy on the backup and data recovery (BDR) server 112 exemplarily illustrated in FIG. 1, rather than competing for computational resources with other primary applications on client devices 101 that are being protected. The SRFS 100 allows transmission of multiple streams of fixed sized data blocks 101a, 101b, 101c, and 101d received from the client devices 101 to a common shared pool of data blocks for deduplication of common data blocks between files and datasets across the client devices 101 on a global basis. Thus, the SRFS 100 backs up the variable sized data chunks across the client devices 101 by storing only a single instance of each of the variable sized data chunks 129a, 129b, 129c, and 129d on the BDR server 112.

FIGS. 6A-6B exemplarily illustrate deduplication of fixed sized data chunks and variable sized data chunks for storing data and managing changes to the data in a storage device, for example, a disk. Consider an example where a minor modification is made to a sentence in a file stored in the disk. The sentence comprises, for example, a stream of fixed sized data chunks, that is, data chunks of fixed lengths as exemplarily illustrated in FIG. 6A, or a stream of variable sized data chunks, that is, data chunks of variable lengths as exemplarily illustrated in FIG. 6B. FIGS. 6A-6B exemplarily illustrate the difference in results before and after the deduplication of the sentence when the sentence comprises fixed sized data chunks and when the sentence comprises variable sized data chunks. Consider there is a change in the first word of the sentence from "A" to "The". In this example, the fixed length of a fixed sized data chunk is 5 characters. A small change in the first fixed sized data chunk affects the downstream fixed sized data chunks. There are no duplicate fixed sized data chunks before and after the first word changes in FIG. 6A. Therefore, in case of the fixed sized data chunk deduplication, after the change, the secure relational file system (SRFS) 100 exemplarily illustrated in FIG. 1, stores the entire sentence again owing to zero duplicate fixed sized data chunks after the word change. However, in the variable sized data chunk deduplication, only the first variable sized data chunk registers the change and none of the downstream variable sized data chunks are affected as exemplarily illustrated in FIG. 6B. Therefore, the SRFS 100 captures the downstream variable sized data chunks as duplicate variable sized data chunks and eliminates the redundancy involved in storing the entire sentence again. The SRFS 100 stores only the changed variable sized data chunk, that is, the first variable sized data chunk.

The secure relational file system (SRFS) 100 modifies the logical boundaries of the variable sized data chunks based on context and processes changes in such a way that the logical boundaries are modified in tune with the changes. Thus, a change to a single variable sized data chunk does not affect the downstream variable sized data chunks in case of the variable sized data chunk deduplication, and the SRFS 100 deduplicates other unchanged variable sized data chunks for reducing size of the storage required for backup of the data. Due to the global, variable sized data chunk deduplication, the SRFS 100 achieves about 90% reduction in storage requirements, thereby reducing large storage volumes required for a full backup and an incremental backup.

Figures 7, 8:
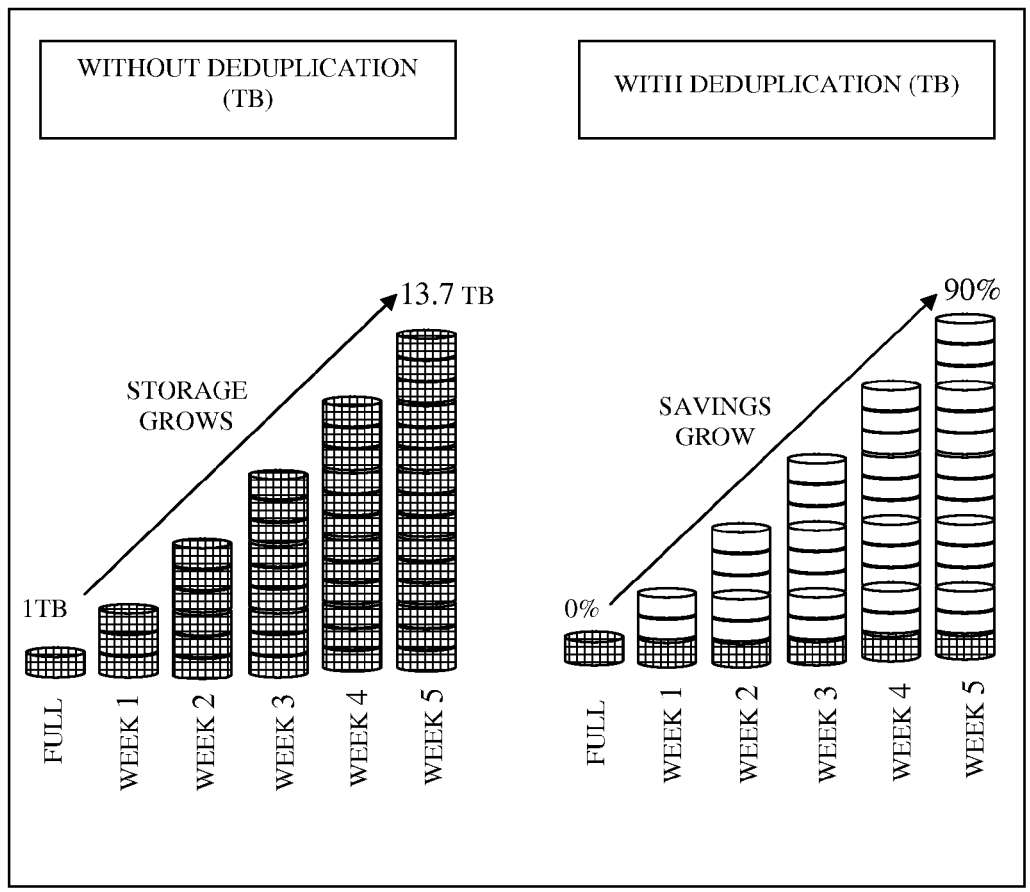
FIGS. 7-8 exemplarily illustrate an effect of deduplication of data in a storage device.

FIGS. 7-8 exemplarily illustrate an effect of deduplication of data in a storage device. FIG. 7 exemplarily illustrates a tabular representation of an effect of deduplication on data storage size before and after deduplication of data across five weeks. FIG. 8 exemplarily illustrates a graphical representation of an effect of deduplication on data storage size before and after deduplication of data. Consider an example where a customer wants to retain the data for a period of 35 days, that is, about 5 weeks with a restore point being made available for each day. The customer administrator schedules one full backup at the beginning of every week and creates an incremental backup at the end of each day as exemplarily illustrated in FIG. 7. Consider that size of the incremental backup increases by about 5% and the initial backup data size is about 1 terabyte (TB). Disregarding the effect of deduplication in the first full backup, the storage size of the backup results in an increase to about 13.7 TB at the end of the 35-day period without deduplication. However, when the secure relational file system (SRFS) 100 exemplarily illustrated in FIG. 1, deduplicates the data, the resultant increase in the storage size at the end of the 35-day period is about 1.37 TB as exemplarily illustrated in FIGS. 7-8. Thus, the SRFS 100 increases the savings on the storage size required for the backup by about 90%.

Figure 9:
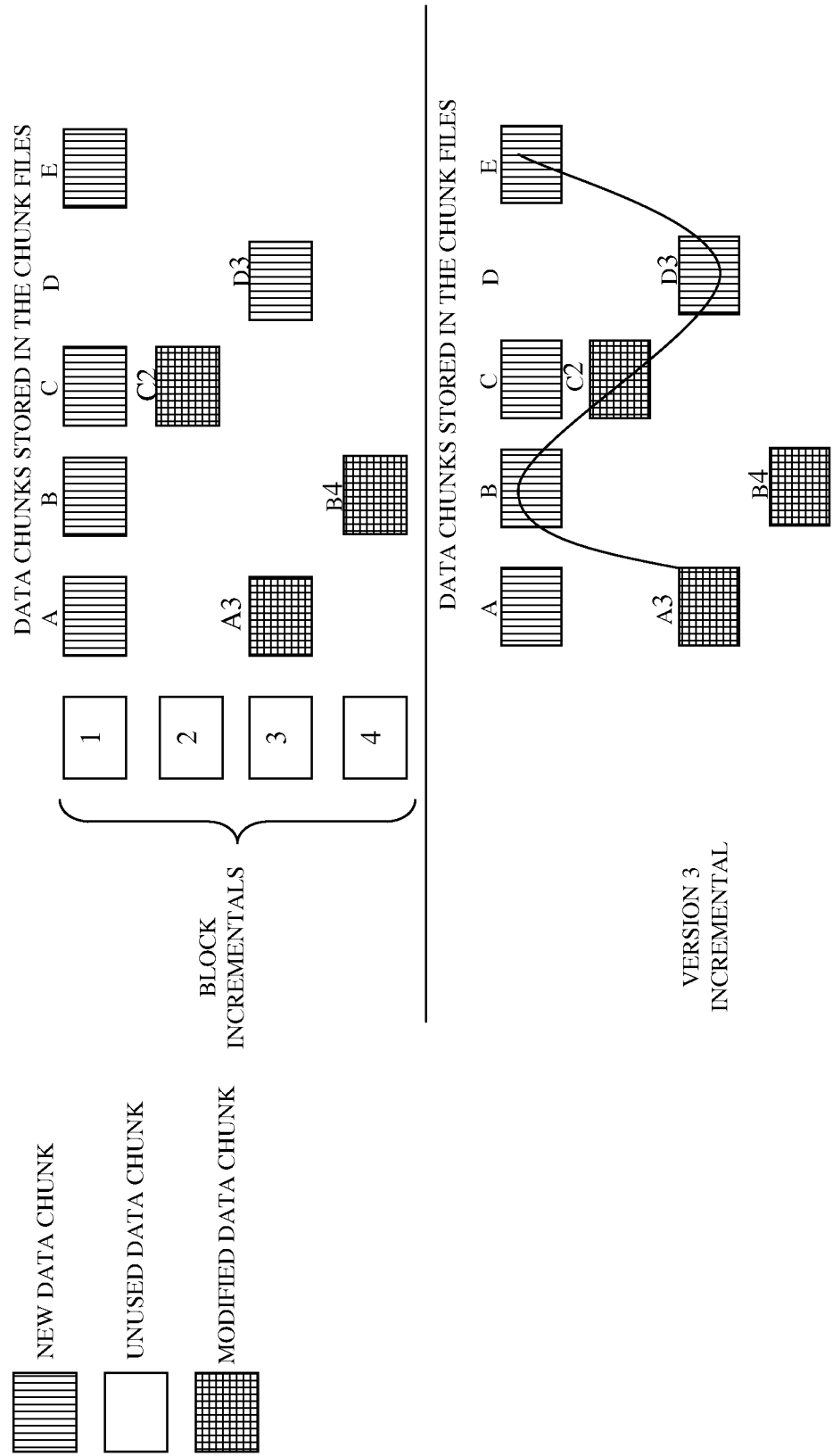
FIG. 9 exemplarily illustrates data chunk management by the secure relational file system for a point-in-time restoration or an instant restoration of previous versions of the stored data.

FIG. 9 exemplarily illustrates data chunk management by the secure relational file system (SRFS) 100 exemplarily illustrated in FIG. 1, for a point-in-time restoration or an instant restoration of previous versions of the stored data. Conventionally, an incremental backup without deduplication may require merging of multiple different incremental backups for restoring a file to a particular point in time. However, the SRFS 100 abstracts the storage for restoring a file by retrieving data chunks of the file using pointers. The SRFS 100 retrieves the pointers to the changed data chunks of an individual file across multiple incremental backups and assembles the retrieved data chunks in a predefined order. Thus, the SRFS 100 avoids the process of merging multiple previous incremental backups. Hence, backup and restore functionalities become scalable with an upgrade of the resources and storage of the backup and data recovery (BDR) server 112 exemplarily illustrated in FIG. 1.

The secure relational file system (SRFS) 100 splits data received from one or more client devices 101 exemplarily illustrated in FIG. 1, into multiple fixed sized data chunks, and thereafter splits the fixed sized data chunks into variable sized data chunks. Every incremental backup comprises storing used data chunks that changed since last backup. In an embodiment, the SRFS 100 maintains logical boundaries of the fixed sized data chunks at the client devices 101 for supporting the point-in-time restore of the backed up data. The client devices 101 do not transmit unused data chunks and/or unchanged data chunks to the backup and data recovery (BDR) server 112. Consider an example where a client device 101 splits data on a disk into 5 equal or fixed sized data chunks A, B, C, D, and E. During a first full backup, the client device 101 transmits used data chunks A, B, C, and E to the BDR server 112. During a second incremental backup, the client device 101 transmits changed data chunk C as a separate version C2. Similarly, during a third incremental backup, the client device 101 transmits changed data chunk A as A3 and an additional data chunk D as D3. During a fourth incremental backup, the client device 101 transmits changed data chunk B as B4. The SRFS 100 stores metadata of each of the data chunks A, B, C, D, and E in the metadata database 130 exemplarily illustrated in FIG. 1. The metadata comprises a unique identifier (UID) for each of the data chunks A, B, C, D, and E, and a location of each of the data chunks A, B, C, D, and E. The SRFS 100 performs an instant point-in-time restore of the disk for full backup archives or any of the incremental backup archives by querying the metadata database 130 comprising the metadata for the data chunks that are to be fetched. For example, to restore a third incremental, the SRFS 100 queries the metadata database 130 for fetching storage locations of the data chunks A3, B, C2, D3, and E. The SRFS 100 restores the disk by retrieving and aggregating the data chunks A3, B, C2, D3, and E from the chunk files 129 exemplarily illustrated in FIG. 1, using the storage locations as disclosed in the detailed description of FIG. 3.

Figure 10:
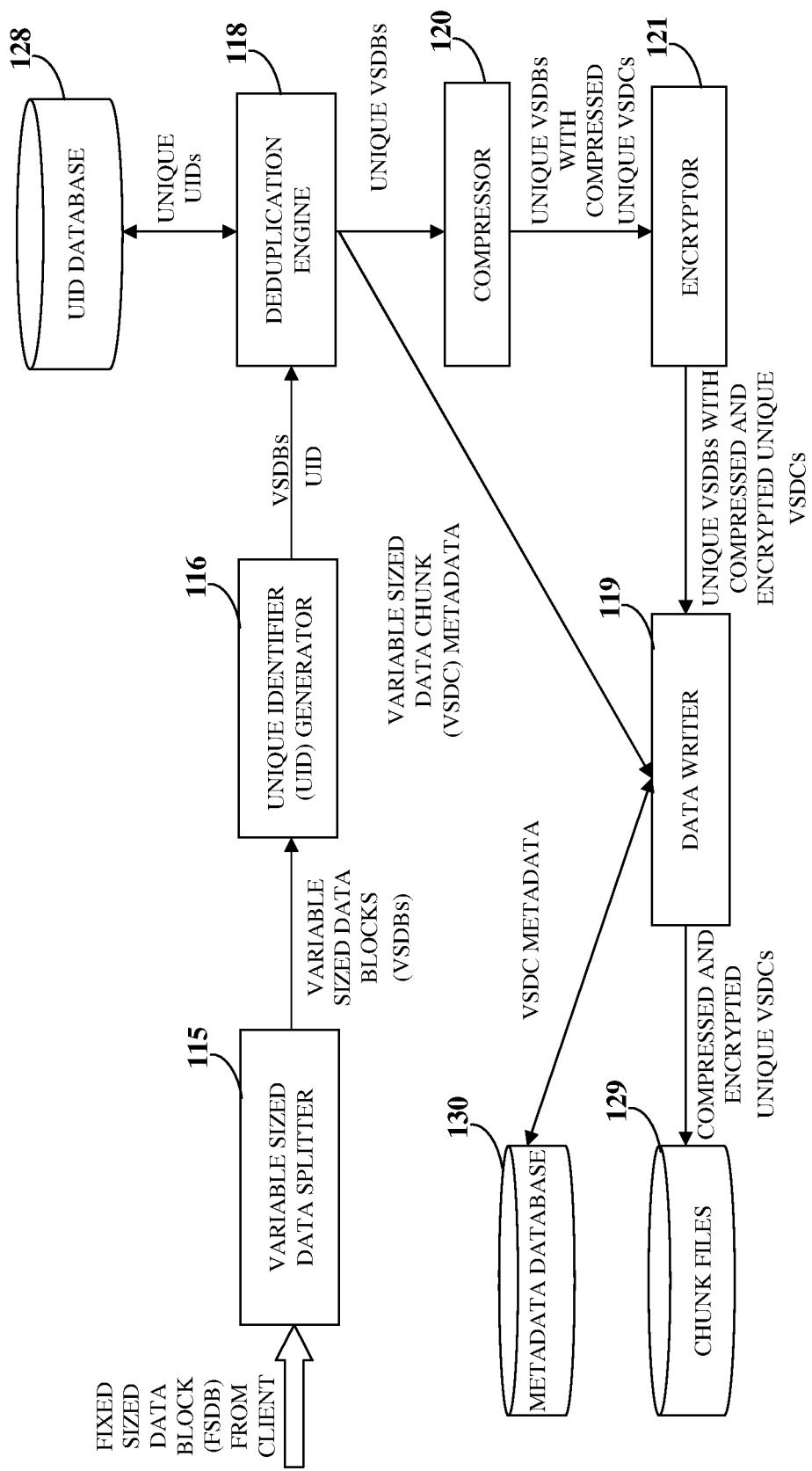
FIG. 10 exemplarily illustrates a block diagram of the secure relational file system for backup of data.

FIG. 10 exemplarily illustrates a block diagram of the secure relational file system (SRFS) 100 exemplarily illustrated in FIG. 1, for backup of data. The performance of the modules disclosed herein is in terms of amount of data processed, that is, a number of bytes of data received as an input and a number of bytes of data processed as an output, data processing speeds, etc. Consider an example where a client device 101 exemplarily illustrated in FIG. 1, backs up a set of files and folders stored in a native file system such as a new technology file system (NTFS) or a fourth extended (ext4) file system to a backup server, for example, the backup and data recovery (BDR) server 112 exemplarily illustrated in FIG. 1, that employs the SRFS 100. Consider the total size of the backup data is, for example, 41.8 gigabytes (GB). The BDR server 112 is configured, for example, with an Intel Xeon® of Intel Corporation e5 2620 version 2, 2.10 gigahertz (GHz) 12 core processor, a 32 GB random access memory (RAM), a 7200 revolutions per minute (RPM) disk drive, and a Gigabit Ethernet. The BDR server 112 receives the fixed sized data blocks (FSDBs) from the client device 101. The metadata overhead for the fixed sized data blocks is, for example, about 0.01% for about 85607 fixed sized data blocks. The speed of transfer of the fixed sized data blocks from the client device 101 is, for example, about 1.02 Gbps. The variable sized data splitter 115 splits the fixed sized data chunks of the received fixed sized data blocks into, for example, about 430346 variable sized data chunks (VSDCs), each having an average size of 102 Kilobytes (KB) and creates variable sized data blocks (VSDBs) for the variable sized data chunks by prepending to the variable sized data chunks, the second metadata of the corresponding fixed sized data chunks from which the corresponding variable sized data chunks were built. The variable sized data splitter 115 transfers the variable sized data blocks to the unique identifier (UID) generator 116 at a speed of, for example, about 981 megabits per second (Mbps). The metadata storage overhead for the fixed sized data blocks and the variable sized data blocks is about 0.03% of the original backup data.

The unique identifier (UID) generator 116 generates UIDs for the variable sized data chunks of the received variable sized data blocks at a speed of, for example, about 981 Mbps. The UID overhead is, for example, about 0.06% of the original backup data. The UID generator 116 generates the third metadata comprising a corresponding UID for each of the variable sized data chunks, prepends the third metadata to the corresponding variable sized data blocks received from the variable sized data splitter 115, and transfers the variable sized data blocks (VSDBs) to the deduplication engine 118 at a speed of, for example, about 981 Mbps. The deduplication engine 118 identifies unique variable sized data chunks from the variable sized data chunks of the received variable sized data blocks using the generated UIDs, in communication with the UID database 128, at a speed of, for example, about 981 Mbps, and transfers the corresponding unique variable sized data blocks to the compressor 120 at a speed of, for example, about 981 Mbps. The deduplication engine 118 achieves a deduplication ratio of, for example, about 12%. The deduplication ratio is an amount of data in bytes before data deduplication divided by an amount of data in bytes after data deduplication. The deduplication engine 118 transfers the UIDs of the unique variable sized data chunks to the UID database 128 for storage. This UID storage size is, for example, about 31 megabytes (MB). The deduplication engine 118 also transfers the metadata of the duplicate variable sized data chunks to the data writer 119.

The compressor 120 compresses the identified unique variable sized data chunks of the received unique variable sized data blocks at a speed of, for example, about 989 Mbps and achieves a compression ratio of, for example, about 53%. The compression ratio is an amount of data in bytes before data compression divided by an amount of data in bytes after data compression. The compressor 120 transfers the corresponding unique variable sized data blocks with the compressed unique variable sized data chunks to the encryptor 121 at a speed of, for example, about 989 Mbps. The encryptor 121 encrypts the compressed unique variable sized data chunks of the received unique variable sized data blocks at a speed of, for example, about 986 Mbps, and transfers the corresponding unique variable sized data blocks with the compressed and encrypted unique variable sized data chunks to the data writer 119 at a speed of, for example, about 986 Mbps.

The data writer 119 stores, that is, writes the compressed and encrypted unique variable sized data chunks of the received unique variable sized data blocks in the chunk files 129 at a speed of, for example, about 981 Mbps. The total size of storage of data in the chunk files 129 is, for example, about 17.28 GB. The data writer 119 extracts and stores metadata of the unique variable sized data chunks and the duplicate variable sized data chunks in the metadata database 130. During the backup, each module of the secure relational file system (SRFS) 100 adds metadata to the data received from the client device 101. The total metadata added and stored in the metadata database 130 is, for example, less than 1% of the size of the data being backed up. The size of the metadata database 130 is, for example, about 195 MB. Thus, each of the modules 115, 116, 118, 120, 121, and 119 processes data at, for example, about 1 gigabit per second (Gbps). This processing speed is dependent on one or more of multiple factors comprising, for example, the Ethernet connection that provides data to each of these modules 115, 116, 118, 120, 121, and 119 during backup, the read and write speeds of a hard disk, etc. The SRFS 100 performs multiple advanced use cases, for example, instant restores of any version of any file and sharing the restored file with multiple users using the second metadata and the third metadata. The BDR server 112 uses, for example, about 0.1% of the size of the backup data as pointers to replace, for example, about 12% of the duplicate data present in the backup data, thereby saving, for example, about 5 GB of redundant data storage. An additional storage saving of, for example, about 19 GB occurs due to data compression. The overall storage reduction that the SRFS 100 achieves due to deduplication and compression is, for example, about 58%. In this example, the total storage size including the size of the unique identifier (UID) database 128 is 17.5 GB.

Figure 11:
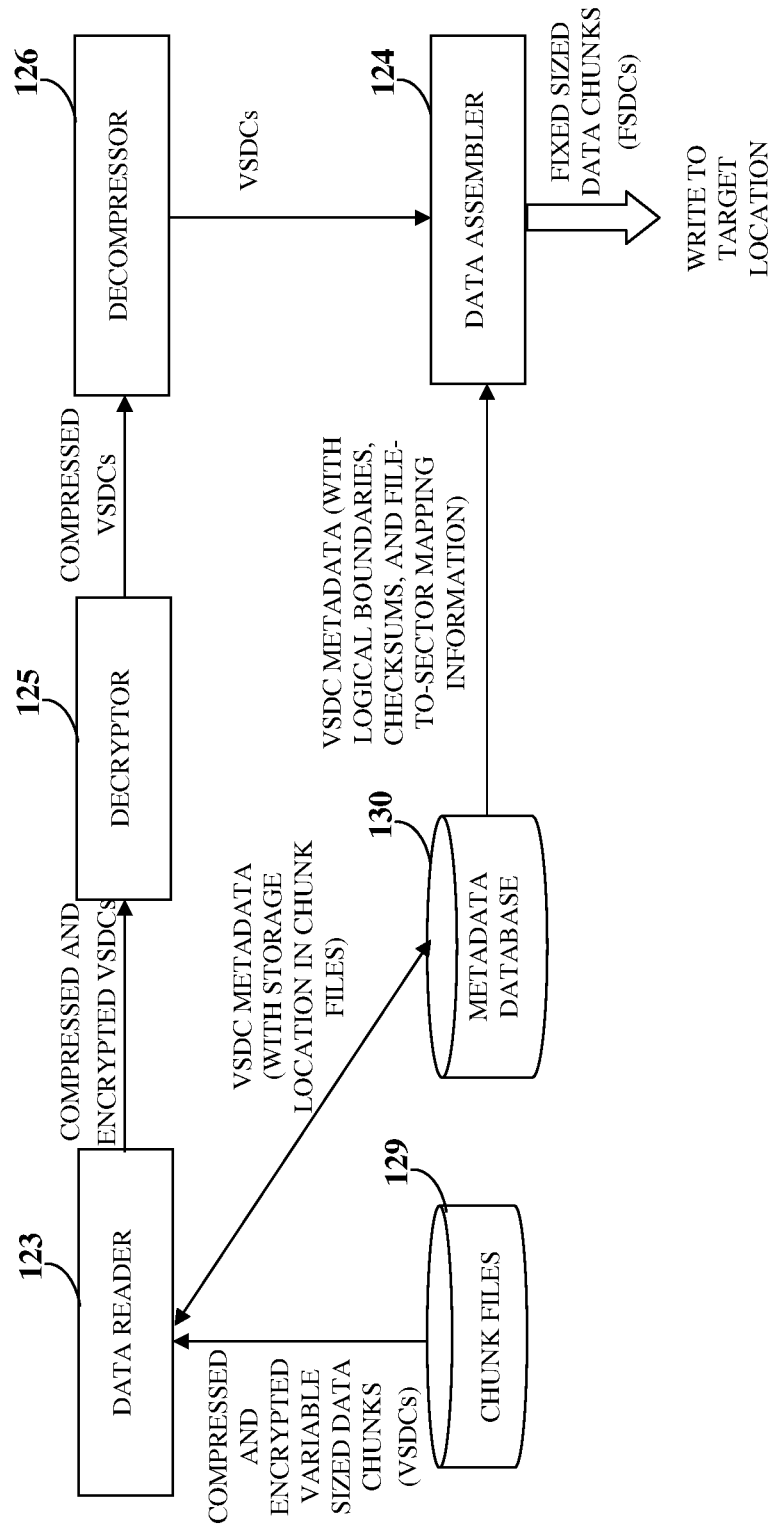
FIG. 11 exemplarily illustrates a block diagram of the secure relational file system for restore of backup data.

FIG. 11 exemplarily illustrates a block diagram of the secure relational file system (SRFS) 100 exemplarily illustrated in FIG. 1, for restore of backup data. Consider an example where a client device 101 exemplarily illustrated in FIG. 1, restores a set of files and folders from a backup server, for example, the backup and data (BDR) server 112 exemplarily illustrated in FIG. 1, that employs the SRFS 100. The data reader 123 queries the metadata database 130 to receive metadata comprising a list of storage locations of the unique variable sized data chunks and the unique instances of the duplicate variable sized data chunks, in the chunk files 129. On receiving this list, the data reader 123 retrieves, for example, about 430346 compressed and encrypted variable sized data chunks from the chunk files 129 at a speed of, for example, about 1.15 gigabits per second (Gbps). The size of data retrieved, that is, the total size of the retrieved, compressed and encrypted variable sized data chunks is, for example, about 17.28 gigabytes (GB). The data reader 123 transfers the retrieved, compressed and encrypted variable sized data chunks to the decryptor 125 at a speed of, for example, about 1.15 Gbps. The decryptor 125 decrypts the retrieved, compressed and encrypted variable sized data chunks at a speed of, for example, about 854 Mbps and transfers the decrypted variable sized data chunks to the decompressor 126 at a speed of, for example, about 854 Mbps.

The decompressor 126 decompresses the decrypted variable sized data chunks at a speed of, for example, about 1.263 Gbps. The size of the decompressed data is, for example, about 41.8 GB. The decompressor 126 transfers the decompressed variable sized data chunks to the data assembler 124 at a speed of, for example, about 1.263 Gbps. The data assembler 124 retrieves the metadata comprising, for example, the logical boundaries used for splitting the data into fixed sized data chunks, the checksums of the content in the fixed sized data chunks, the file to sector mapping information, etc., from the metadata database 130. The data assembler 124 assembles the decrypted and decompressed variable sized data chunks in a predefined order at a speed of, for example, about 1.263 Gbps using the received metadata for regenerating and restoring, for example, about 85766 fixed sized data chunks at a restore target location, that is, in the client device 101. The assembled data is of a size of, for example, about 41.8 GB.

Figure 12:
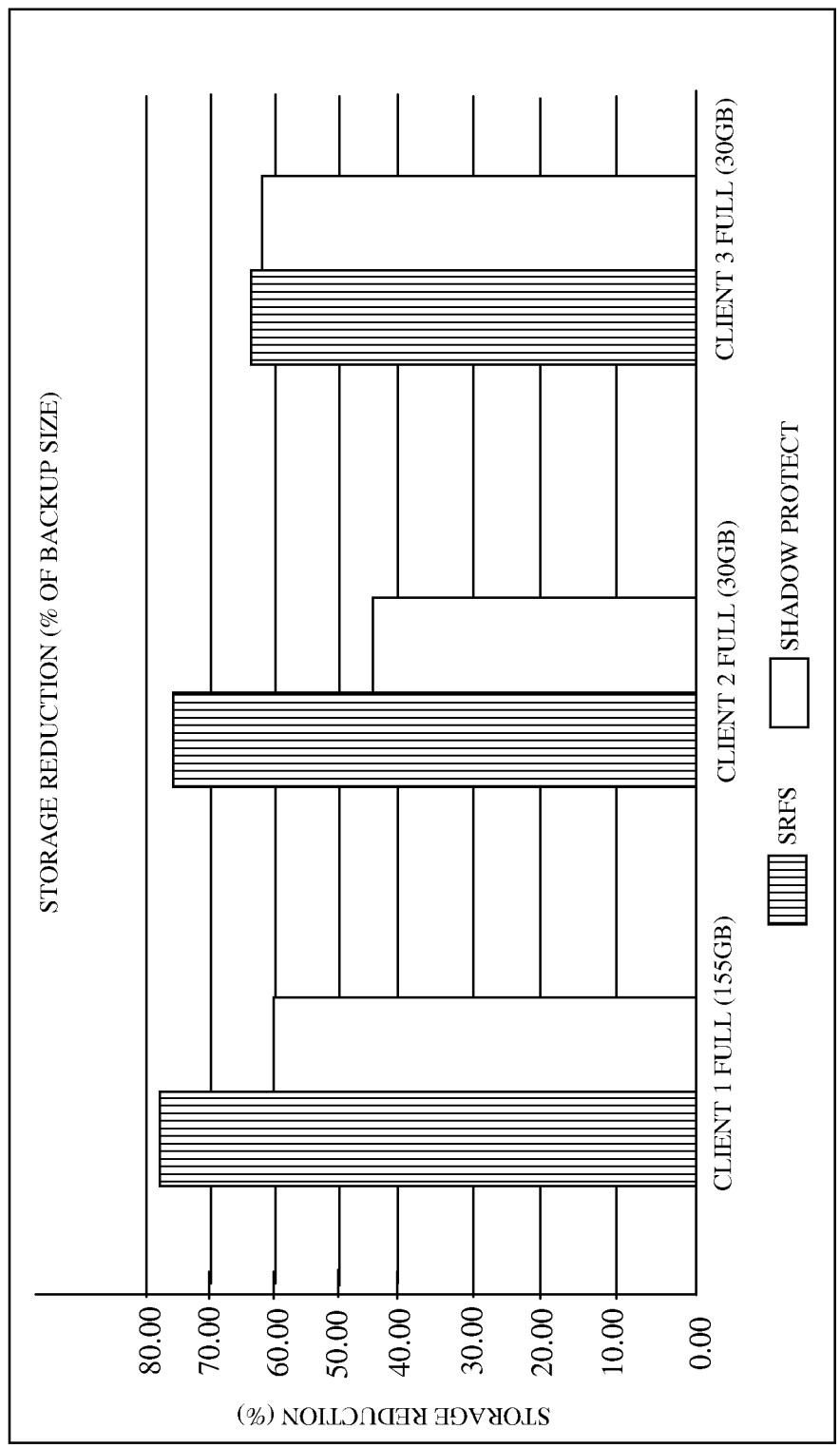
FIG. 12 exemplarily illustrates a comparative graphical representation of storage reduction achieved by the secure relational file system and a backup server employing a new technology file system.

FIG. 12 exemplarily illustrates a comparative graphical representation of storage reduction achieved by the secure relational file system (SRFS) 100 and a backup server employing a new technology file system (NTFS). Consider an example where deduplication performance of the SRFS 100 is compared with a backup product, for example, a backup server using the NTFS file system, for example, ShadowProtect® of StorageCraft Technology Corporation, as exemplarily illustrated in FIG. 12, for the following scenarios. In a first scenario, Client 1 performs a full disk image backup of a system, for example, Windows® 2008 of Microsoft Corporation, R2 OS & Boot that has 155 gigabyte (GB) primary data, and performs an exchange database incremental backup of 3 GB and a file incremental backup of 18 GB. In a second scenario, Client 2 performs a full disk image backup of a system, for example, Windows® 7 of Microsoft Corporation, OS & Boot that has 30 GB primary data. In a third scenario, a Client 3 performs a full disk image backup of a system, for example, a data file partition that comprises 30 GB primary data. The graphical representation of results from the comparative analysis of using the SRFS 100 and the ShadowProtect® file system in the three scenarios is exemplarily illustrated in FIG. 12. As exemplarily illustrated in FIG. 12, the SRFS 100 uses about 50% lesser storage as compared to the storage usage of the ShadowProtect® file system, reduces storage size per backup by about 10% more than that of the ShadowProtect® file system even on highly compressible data files, and achieves about 80% backup storage space reduction.

Figure 13:
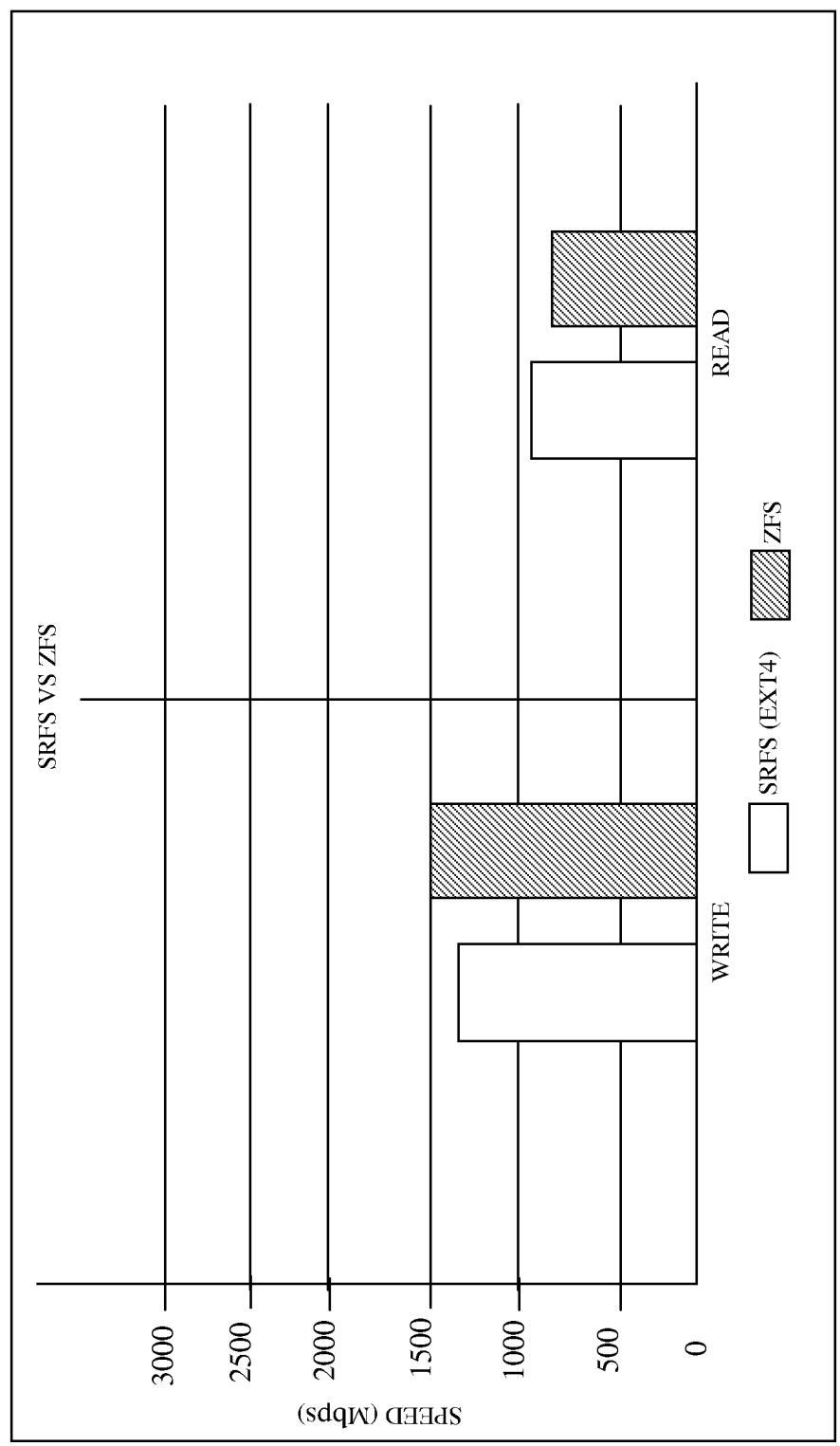
FIGS. 13-16 exemplarily illustrate comparative graphical representations of storage reduction and speed achieved by the secure relational file system against other file systems.

FIGS. 13-16 exemplarily illustrate comparative graphical representations of storage reduction and speed achieved by the secure relational file system (SRFS) 100 exemplarily illustrated in FIG. 1, against other file systems. FIGS. 13-16 exemplarily illustrate comparative analyses of efficiency of backup and restore, that is, data writes and data reads that the SRFS 100 performs in comparison with other file systems comprising, for example, a kernel-level versioning file system such as the Zeta File system (ZFS®) of Oracle America, Inc., a new technology file system (NTFS), a fourth extended (ext4) file system, etc. The comparative analyses explain the overhead of the user level file system, for example, the SRFS 100 in comparison with other file systems. The Zeta File system (ZFS®) is a kernel level file system. ZFS® is also a file system with versioning and deduplication. However, ZFS® does not store metadata in a database and thus cannot support extensive use cases that the secure relational file system (SRFS) 100 supports. FIG. 13 exemplarily illustrates the graphical results of a comparative analysis of data read and data write performances, that is, processing speed in performing data backup and data restore, of ZFS® and the SRFS 100. The ZFS® is comparatively faster during data writes when compared with the SRFS 100. However, the SRFS 100 is faster than the ZFS® during data reads. Also, the SRFS 100 supports instant restoration or access to any version of the data stored in the chunk files 129 of the SRFS 100 exemplarily illustrated in FIG. 1. In the ZFS®, the current version of the data has to be merged with the existing snapshots and reverted back to the version that is to be restored. The merging is both central processing unit (CPU) intensive and time consuming. Moreover, once ZFS® reverts to a previous version, all the later versions after the reverted version are lost. In the SRFS 100, all the versions are always available for instant restoration at any point in time.

Figure 14:
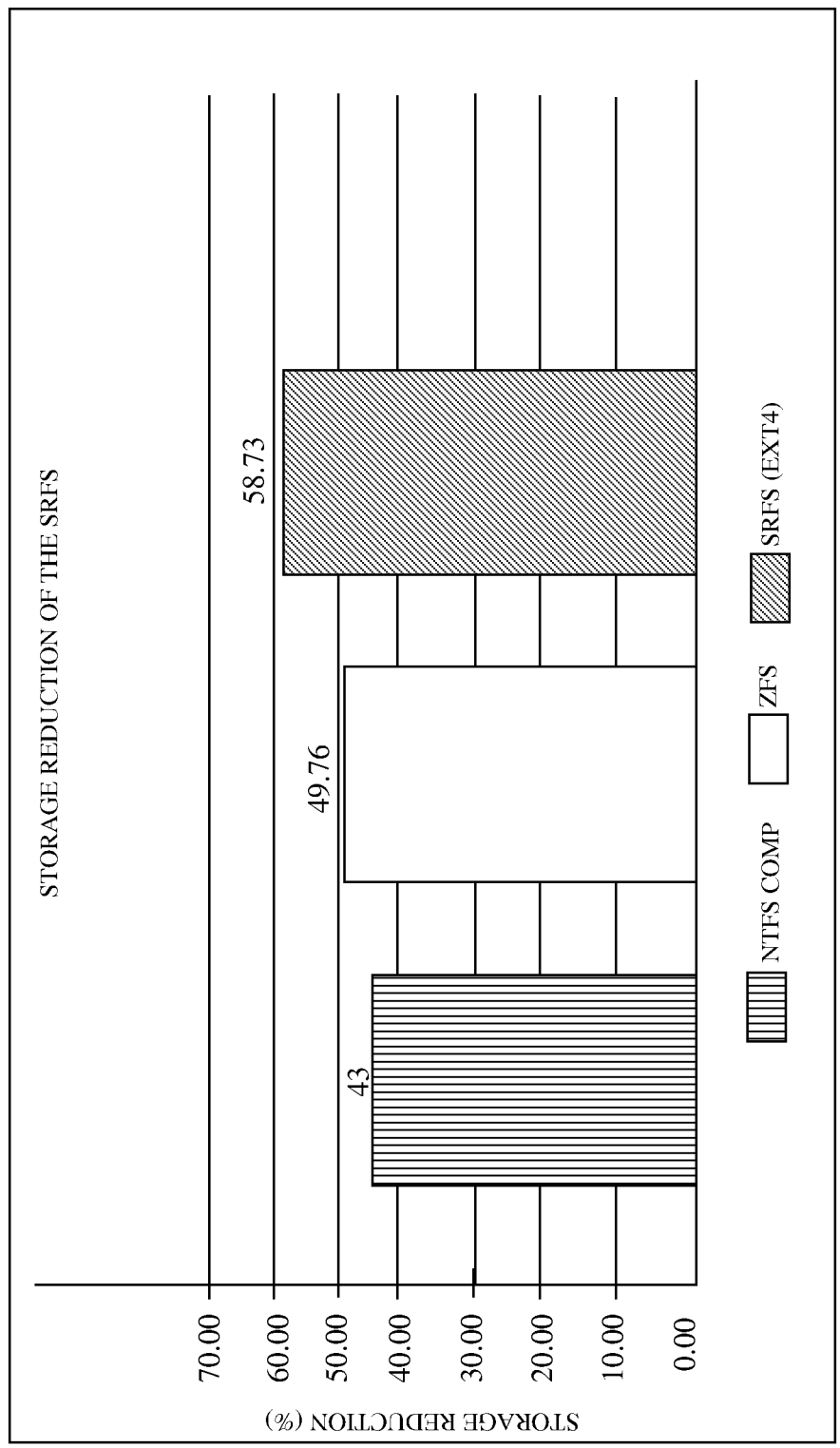

FIG. 14 exemplarily illustrates storage reduction that the secure relational file system (SRFS) 100 exemplarily illustrated in FIG. 1, achieves when compared to the ZFS® and the new technology file system (NTFS). More the data added to the SRFS 100, more is the storage reduction that SRFS 100 provides due to deduplication. The ZFS® is known to demand a higher random access memory (RAM) for performing deduplication. The ZFS® cannot perform instant restoration of a version of the data stored in the ZFS®. Since the SRFS 100 uses databases for storing data and metadata, deduplication on the SRFS 100 runs faster using lesser memory when compared to the ZFS® and the NTFS. The SRFS 100 can also perform instant restoration of any version of the data stored in the chunk files 129 of the SRFS 100 exemplarily illustrated in FIG. 1.

Figure 15:
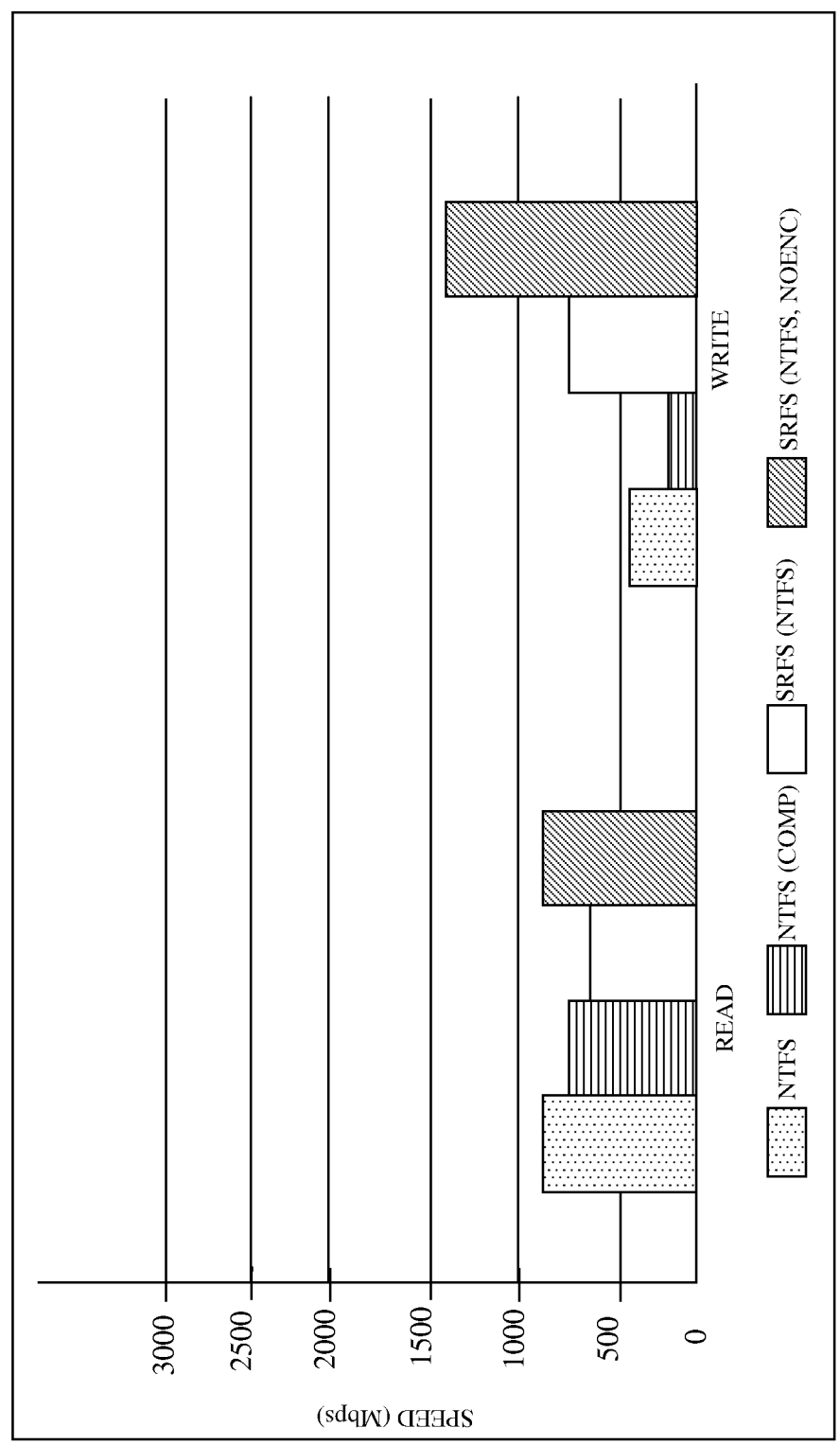
Figure 16:
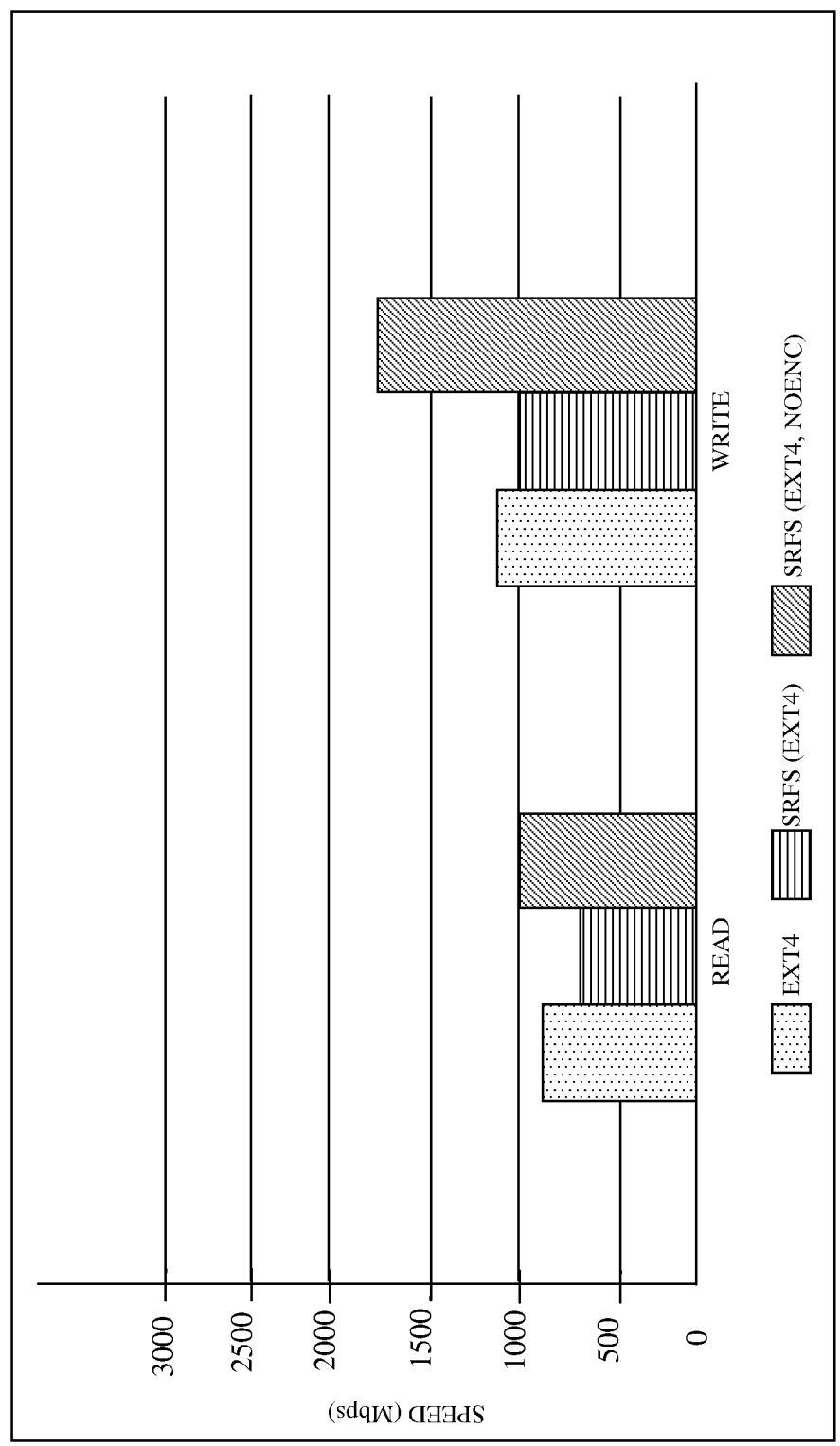

FIGS. 15-16 exemplarily illustrate graphical representations of a comparative analysis of performance of the secure relational file system (SRFS) 100 exemplarily illustrated in FIG. 1, with native file systems such as the new technology file system (NTFS) and the fourth extended (EXT4) file system. The file systems used in the comparative analysis comprise, for example, NTFS such as Windows® 2012R2 of Microsoft Corporation on NTFS; NTFS Compressed (COMP) such as Windows® 2012 R2 on NTFS COMP, that is, NTFS with compressed files and folders; SRFS (NTFS) such as the secure relational file system (SRFS) 100 running on top of the NTFS; the SRFS (NTFS, no encryption (NOENC)) such as the SRFS(NTFS) with encryption disabled; EXT4 such as Ubuntu® of Canonical Limited company 12.04 on EXT4; the SRFS(EXT4) such as the SRFS 100 on top of EXT4; SRFS(EXT4, NOENC) such as the SRFS 100 with encryption disabled; etc.

The results of the comparative analyses as exemplarily illustrated in FIGS. 15-16 indicate that the secure relational file system (SRFS) 100 suffers negligible performance compromise and is able to support advanced use cases comprising, for example, data restores, incremental backups, integrity checks, etc., which the native file systems do not support. FIG. 15 exemplarily illustrates that the SRFS 100 with compression and encryption performs better than the new technology file system (NTFS) with compression enabled for both data writes and data reads. The SRFS 100 performs better than the native file systems in some cases due to the fact that the size of data that the SRFS 100 writes or backs up is 58% lesser than the size of actual data to be backed up. This reduction in data storage is achieved because the SRFS 100 uses deduplication and compression. If the encryption is disabled in the SRFS 100, the SRFS (NTFS, NOENC) performs better than SRFS (NTFS) due to the absence of encryption overhead during writes and decryption overhead during reads.

Typically, the efficiency of a data deduplication mechanism is measured as a ratio referred herein as a deduplication ratio. The deduplication ratio is calculated as the amount of data in bytes before data deduplication divided by the amount of data in bytes after data deduplication.

$$\text{Deduplication ratio} = \frac{\text{Size of data before deduplication}}{\text{Size of data after deduplication}}$$

The deduplication ratio is dependent on multiple factors associated with nature, composition, retention, and characteristics of data being processed. The deduplication depends, for example, on the type of the files comprising the data, a length of time for which the data is retained, and the frequency of changes made to the data. The files, for example, documents prepared using Microsoft Office® of Microsoft Corporation, spread sheets, and presentations typically have higher chances of redundant data occurrences at a block level and as a result much higher deduplication ratios. Audio, image, and video files typically have a lower level of redundancy at the block level due to use of deduplication at the source, therefore, resulting in lower deduplication ratios. In terms of a length of time that the data is retained in a storage device, the longer the data is retained, the higher is the probability of finding duplicates in the data.

Using the deduplication technology implemented by the secure relational file system (SRFS) 100, the optimal deduplication ratio achieved is, for example, up to 25:1 for 10 terabyte (TB) backup sets with about 80% Microsoft Office® documents and about 20% electronic mails (emails). Higher the deduplication ratio, marginal is the improvement in storage space savings. The deduplication ratios of about 100:1 or 200:1 deliver marginal increases in savings but at a cost of data processing overhead. For example, considering deduplicating 10 TB of backup data, a 25:1 deduplication ratio reduces the size of the data to about 409.6 gigabyte (GB). This is close to about 96% compression of the original data set. However, a 100:1 deduplication ratio results in an additional 3.6% savings in disk space at the cost of the data processing overhead. Copying and dereferencing pointers is cheaper than copying and accessing the actual data segments that are being referenced using pointers. When a file is being accessed, the SRFS 100 dereferences the pointers in the metadata of the file, while equally allowing for scope of a single data block to have multiple pointers.

The integrity of data, in general, depends on the configuration and the quality of the file systems. The secure relational file system (SRFS) 100 checks the integrity of data by identifying duplicate segments of data or data chunks using hash functions. A hash collision occurs when two different pieces of data generate the same hash value. The SRFS 100 gauges the probability of occurrence of such hash collisions, determines how the probability of the hash collisions compares with possible alternatives, and estimates likely causes of failure resulting in the hash collisions. In mathematical parlance, the problem of hash collisions is referred to as the "the birthday paradox" that approximates about a 50% probability of collision to a square root of a number of possible outputs. Given the adoption of a hashing function such as the secure hash algorithm 2 (SHA-2), the hash collisions may be eliminated. For a 512 bit hash, the probability of occurrence of a hash collision is about one in $1.4*10^{77}$ cases, that is, about one in more than 1 thousand trillion trillion trillion trillion trillion trillion occurrences. Also, when compared to the possible alternatives, this probability of occurrence of the hash collisions results in about zero probability of a data loss. For example, the risk of an uncorrectable bit error rate of a typical hard disk is about 50% for 1015 bytes, that is, about 1 petabyte (PB) or 1000 TB of data.

Since the secure relational file system (SRFS) 100 performs inline processing on the backup and data recovery (BDR) server 112 exemplarily illustrated in FIG. 1, the performance of backup and restore of the data is substantially higher than that of other file systems, since the client devices 101 exemplarily illustrated in FIG. 1, do not handle computationally demanding tasks and there is no competition for resources with primary applications residing and running on workstations of the client devices 101. The SRFS 100 performs, for example, about 80% faster backups and achieves, for example, about 80% reduction in backup windows. The SRFS 100 performs restoration with 70% reduction in time. The deduplication of the SRFS 100 enhances the data recovery process during restoration of a single file or restoration of an entire disk image to a certain point in time.

The secure relational file system (SRFS) 100 addresses cost factors across multiple domains comprising, for example, a storage domain, a compliance domain, a network domain, an infrastructure domain, a data protection domain, etc. Implementation of the SRFS 100 reduces costs involved in storing data for periodic full backups and incremental backups, and archiving data as per corporate retention policies. Implementation of the SRFS 100 reduces wide area network (WAN) bandwidth costs due to lesser data migration for replication and offsite data recovery and disaster recovery. Thus, the SRFS 100 offers faster backups with reduced backup windows and lowers time for data restoration and data replication.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hardwired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Examples of programming languages that can be used comprise C, C++, C#, Java®, JavaScript®, Golang developed by Google Inc., etc. Other object-oriented, functional, scripting, and/or logical programming languages may also be used. The computer program codes or software programs may be stored on or in one or more mediums as object code. Various aspects of the method and the SRFS 100 disclosed herein may be implemented as programmed elements, or non-programmed elements, or any suitable combination thereof. The computer program product disclosed herein comprises one or more computer program codes for implementing the processes of various embodiments.

Where databases are described such as the unique identifier database 128, the database storing the chunk files 129, the metadata database 130, etc., exemplarily illustrated in FIG. 1, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the secure relational file system (SRFS) 100, the databases may be integrated to communicate with each other for enabling simultaneous updates of data linked across the databases, when there are any updates to the data in one of the databases.

The method and the secure relational file system (SRFS) 100 disclosed herein can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the secure relational file system (SRFS) 100 disclosed herein are not limited to a particular computer system platform, processor, operating system, or network. One or more aspects of the method and the SRFS 100 disclosed herein may be distributed among one or more computer systems, for example, servers configured to provide one or more services to one or more client devices, or to perform a complete task in a distributed system. For example, one or more aspects of the method and the SRFS 100 disclosed herein may be performed on a client-server system that comprises components distributed among one or more server systems that perform multiple functions according to various embodiments. These components comprise, for example, executable, intermediate, or interpreted code, which communicate over a network using a communication protocol. The method and the SRFS 100 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the secure relational file system (SRFS) 100 disclosed herein. While the method and the SRFS 100 have been described with reference to various embodiments, it is understood that the words, which have been used herein, are words of description and illustration, rather than words of limitation. Further, although the method and the SRFS 100 have been described herein with reference to particular means, materials, and embodiments, the method and the SRFS 100 are not intended to be limited to the particulars disclosed herein; rather, the method and the SRFS 100 extend to all functionally equivalent structures, methods and uses, such as are within the scope of the prepended claims. Those skilled in the art, having the benefit of the teachings of this specification, may effect numerous modifications thereto and changes may be made without departing from the scope and spirit of the method and the SRFS 100 disclosed herein in their aspects.

We claim:

1. A computer implemented method for storing data and managing changes to said data in a storage device for backup and restore, said method employing a secure relational file system comprising at least one processor configured to execute computer program instructions for performing said method, said method comprising:

receiving said data for said backup and said restore by said secure relational file system;

generating first metadata associated with said received data for said backup by said secure relational file system, said first metadata comprising file-to-sector mapping information associated with disk storage of said received data in a plurality of sectors in said storage device, said file-to-sector mapping information configured to identify a position of said received data in said storage device and one or more of unused sectors among said sectors and unused data blocks in said storage device for reducing size of storage required for said backup of said received data;

splitting said received data into a plurality of fixed sized data chunks by said secure relational file system using said generated first metadata;

generating second metadata for each of said fixed sized data chunks by said secure relational file system for said restore of said received data, said second metadata comprising logical boundaries used for said splitting of said received data;

creating a plurality of fixed sized data blocks by prepending said generated second metadata to said fixed sized data chunks by said secure relational file system;

splitting said fixed sized data chunks of each of said created fixed sized data blocks into a plurality of variable sized data chunks by said secure relational file system using a plurality of context aware breakpoints in said fixed sized data chunks;

generating a unique identifier for each of said variable sized data chunks by said secure relational file system;

generating third metadata for said each of said variable sized data chunks by said secure relational file system, said third metadata comprising said generated unique identifier;

creating a plurality of variable sized data blocks by said secure relational file system by prepending said generated third metadata of said each of said variable sized data chunks and said generated second metadata from said each of said created fixed sized data blocks to said each of said variable sized data chunks;

identifying unique variable sized data chunks of said created variable sized data blocks using each said generated unique identifier from said generated third metadata by said secure relational file system, in communication with one or more databases of said secure relational file system for deduplication of said variable sized data chunks;

storing said identified unique variable sized data chunks in one or more chunk files of said secure relational file system by said secure relational file system for said backup and said restore of said received data;

adding a location of storage of each of said identified unique variable sized data chunks in said one or more chunk files to said generated third metadata by said secure relational file system; and storing said generated first metadata, said generated second metadata extracted from each of said created variable sized data blocks, and said generated third metadata of said identified unique variable sized data chunks and duplicate variable sized data chunks extracted from said each of said created variable sized data blocks in said one or more databases with minimum additional storage consumption by said secure relational file system for said restore of said received data.

2. The computer implemented method of claim 1, wherein said first metadata further comprises metadata associated with archived data and archived changes to said data for availability during said backup, metadata of a file system used in creation of said disk storage, metadata stored by a file system used in creation of a disk image of said disk storage, metadata of a virtual machine comprising said archived data, and one or more of attributes, permissions, locations, content specifics, offsets, a size of said disk storage, and directory information of said received data.

3. The computer implemented method of claim 1, wherein said second metadata further comprises a unique identifier for each of said fixed sized data chunks, wherein said unique identifier is a checksum of content in said each of said fixed sized data chunks.

4. The computer implemented method of claim 1, wherein said third metadata further comprises backup data associated with said backup, wherein said backup data comprises data of a file system used for storing said backup data and an index of contents of said variable sized data chunks.

5. The computer implemented method of claim 1, further comprising performing an integrity check configured to rectify errors in said identified unique variable sized data chunks by said secure relational file system by adding a parity file to each of said one or more chunk files where said identified unique variable sized data chunks are stored.

6. The computer implemented method of claim 5, further comprising maintaining information of said parity file in a backup file stored at one or more of a plurality of data restore levels by said secure relational file system for facilitating said integrity check at said one or more of said data restore levels, wherein said data restore levels comprise a disk image level, a chunk level, a repository level, a client level, and a backup level.

7. The computer implemented method of claim 1, further comprising restoring backup data by said secure relational file system, said restoration of said backup data comprising:

receiving said stored third metadata comprising said location of said storage of said each of said identified unique variable sized data chunks in said one or more chunk files and a pointer for each of said duplicate variable sized data chunks from said one or more databases by said secure relational file system, wherein said pointer points to a unique instance of said each of said duplicate variable sized data chunks;

retrieving said identified unique variable sized data chunks from said one or more chunk files by said secure relational file system using said location of said storage of said each of said identified unique variable sized data chunks in said one or more chunk files from said received third metadata;

retrieving, from said one or more chunk files, said unique instance of said each of said duplicate variable sized data chunks, to which said pointer from said received third metadata points, by said secure relational file system for retrieving said each of said duplicate variable sized data chunks;

receiving said stored second metadata comprising said logical boundaries used for said splitting of said received data into said fixed sized data chunks and said stored first metadata comprising said file-to-sector mapping information from said one or more databases; and assembling said retrieved unique variable sized data chunks and said retrieved unique instance of said each of said duplicate variable sized data chunks in a predefined order by said secure relational file system for regenerating and restoring said each of said fixed sized data chunks using said received second metadata at a target location identified using said received first metadata.

8. The computer implemented method of claim 1, further comprising performing an incremental backup for maintaining data changed after each said backup of said received data, wherein said incremental backup comprises identifying and storing changed unique variable sized data chunks and additional unique variable sized data chunks in said one or more chunk files by said secure relational file system based on said logical boundaries obtained from said stored second metadata.

9. The computer implemented method of claim 8, further comprising storing metadata of each of said changed unique variable sized data chunks and each of said additional unique variable sized data chunks in said one or more databases by said secure relational file system for allowing each said incremental backup to be used instantly as a full backup, without merging with previous increments.

10. A secure relational file system for storing data and managing changes to said data in a storage device for backup and restore, said secure relational file system comprising:

a non-transitory computer readable storage medium configured to store computer program instructions defined by modules of said secure relational file system;

at least one processor communicatively coupled to said non-transitory computer readable storage medium, said at least one processor configured to execute said defined computer program instructions; and said modules of said secure relational file system comprising:

a data reader configured to receive and read said data for said backup and said restore;

a first metadata generation module configured to generate first metadata associated with said received data for said backup, said first metadata comprising file-to-sector mapping information associated with disk storage of said received data in a plurality of sectors in said storage device, said file-to-sector mapping information configured to identify a position of said received data in said storage device and one or more of unused sectors among said sectors and unused data blocks in said storage device for reducing size of storage required for said backup of said received data;

a fixed sized data splitter configured to split said received data into a plurality of fixed sized data chunks using said generated first metadata;

a second metadata generation module configured to generate second metadata for each of said fixed sized data chunks for said restore of said received data, said second metadata comprising logical boundaries used by said fixed sized data splitter for said splitting of said received data;

said fixed sized data splitter further configured to create a plurality of fixed sized data blocks by prepending said generated second metadata to said fixed sized data chunks;

a variable sized data splitter configured to split said fixed sized data chunks of each of said created fixed sized data blocks into a plurality of variable sized data chunks using a plurality of context aware breakpoints in said fixed sized data chunks;

a unique identifier generator configured to generate a unique identifier for each of said variable sized data chunks;

a third metadata generation module configured to generate third metadata for said each of said variable sized data chunks, said third metadata comprising said generated unique identifier;

said variable sized data splitter configured to create a plurality of variable sized data blocks by prepending said generated third metadata of said each of said variable sized data chunks and said generated second metadata from said each of said created fixed sized data blocks to said each of said variable sized data chunks;

a deduplication engine configured to identify unique variable sized data chunks of said created variable sized data blocks using each said generated unique identifier from said generated third metadata, in communication with one or more databases of said secure relational file system for deduplication of said variable sized data chunks;

a data writer configured to store said identified unique variable sized data chunks in one or more chunk files for said backup and said restore of said received data;

said data writer further configured to add a location of storage of each of said identified unique variable sized data chunks in said one or more chunk files to said generated third metadata; and said data writer further configured to store said generated first metadata, said generated second metadata extracted from each of said created variable sized data blocks, and said generated third metadata of said identified unique variable sized data chunks and duplicate variable sized data chunks extracted from said each of said created variable sized data blocks in said one or more databases with minimum additional storage consumption for said restore of said received data.

11. The secure relational file system of claim 10, wherein said first metadata further comprises metadata associated with archived data and archived changes to said data for availability during said backup, metadata of a file system used in creation of said disk storage, metadata stored by a file system used in creation of a disk image of said disk storage, metadata of a virtual machine comprising said archived data, and one or more of attributes, permissions, locations, content specifics, offsets, a size of said disk storage, and directory information of said received data.

12. The secure relational file system of claim 10, wherein said second metadata further comprises a unique identifier for each of said fixed sized data chunks, wherein said unique identifier is a checksum of content in said each of said fixed sized data chunks.

13. The secure relational file system of claim 10, wherein said third metadata further comprises backup data associated with said backup, wherein said backup data comprises data of a file system used for storing said backup data and an index of contents of said variable sized data chunks.

14. The secure relational file system of claim 10, further comprising an integrity check performance module configured to perform an integrity check for rectifying errors in said identified unique variable sized data chunks by adding a parity file to each of said one or more chunk files where said identified unique variable sized data chunks are stored.

15. The secure relational file system of claim 14, wherein said integrity check performance module is further configured to maintain information of said parity file in a backup file stored at one or more of a plurality of data restore levels for facilitating said integrity check at said one or more of said data restore levels, wherein said data restore levels comprise a disk image level, a chunk level, a repository level, a client level, and a backup level.

16. The secure relational file system of claim 10, further comprising:

said data reader further configured to receive said stored third metadata comprising said location of said storage of said each of said identified unique variable sized data chunks in said one or more chunk files and a pointer for each of said duplicate variable sized data chunks from said one or more databases, wherein said pointer points to a unique instance of said each of said duplicate variable sized data chunks;

said data reader further configured to retrieve said identified unique variable sized data chunks from said one or more chunk files using said location of said storage of said each of said identified unique variable sized data chunks in said one or more chunk files from said received third metadata;

said data reader further configured to retrieve, from said one or more chunk files, said unique instance of said each of said duplicate variable sized data chunks, to which said pointer from said received third metadata points, for retrieving said each of said duplicate variable sized data chunks;

said data reader configured to receive said stored second metadata comprising said logical boundaries used for said splitting of said received data into said fixed sized data chunks and said stored first metadata comprising said file-to-sector mapping information from said one or more databases; and a data assembler configured to assemble said retrieved unique variable sized data chunks and said retrieved unique instance of said each of said duplicate variable sized data chunks in a predefined order for regenerating and restoring said each of said fixed sized data chunks using said received second metadata at a target location identified using said received first metadata.

17. The secure relational file system of claim 10, further comprising a version control module configured to perform an incremental backup for maintaining data changed after each said backup of said received data by identifying changed unique variable sized data chunks and additional unique variable sized data chunks based on said logical boundaries obtained from said stored second metadata, wherein said data writer, in communication with said version control module, is further configured to store said changed unique variable sized data chunks and said additional unique variable sized data chunks in said one or more chunk files.

18. The secure relational file system of claim 17, wherein said data writer is further configured to store metadata of each of said changed unique variable sized data chunks and each of said additional unique variable sized data chunks in said one or more databases for allowing each said incremental backup to be used instantly as a full backup, without merging with previous increments.

19. A computer program product comprising a non-transitory computer readable storage medium, said non-transitory computer readable storage medium storing computer program codes that comprise instructions executable by at least one processor, said computer program codes comprising:
- a first computer program code for receiving data for backup and restore;
- a second computer program code for generating first metadata associated with said received data for said backup, said first metadata comprising file-to-sector mapping information associated with disk storage of said received data in a plurality of sectors in a storage device, said file-to-sector mapping information configured to identify a position of said received data in said storage device and one or more of unused sectors among said sectors and unused data blocks in said storage device for reducing size of storage required for said backup of said received data;
- a third computer program code for splitting said received data into a plurality of fixed sized data chunks using said generated first metadata;
- a fourth computer program code for generating second metadata for each of said fixed sized data chunks for said restore of said received data, said second metadata comprising logical boundaries used for said splitting of said received data;
- a fifth computer program code for creating a plurality of fixed sized data blocks by prepending said generated second metadata to said fixed sized data chunks;
- a sixth computer program code for splitting said fixed sized data chunks of each of said created fixed sized data blocks into a plurality of variable sized data chunks using a plurality of context aware breakpoints in said fixed sized data chunks;
- a seventh computer program code for generating a unique identifier for each of said variable sized data chunks;
- an eighth computer program code for generating third metadata for each of said variable sized data chunks, said third metadata comprising said generated unique identifier;
- a ninth computer program code for creating a plurality of variable sized data blocks by prepending said generated third metadata of said each of said variable sized data chunks and said generated second metadata from said each of said created fixed sized data blocks to said each of said variable sized data chunks;
- a tenth computer program code for identifying unique variable sized data chunks of said created variable sized data blocks using each said generated unique identifier from said generated third metadata, in communication with one or more databases for deduplication of said variable sized data chunks;
- an eleventh computer program code for storing said identified unique variable sized data chunks in one or more chunk files for said backup and said restore of said received data;
- a twelfth computer program code for adding a location of storage of said each of said identified unique variable sized data chunks in said one or more chunk files to said generated third metadata; and
- a thirteenth computer program code for storing said generated first metadata, said generated second metadata extracted from each of said created variable sized data blocks, and said generated third metadata of said identified unique variable sized data chunks and duplicate variable sized data chunks extracted from said each of said created variable sized data blocks in said one or more databases with minimum additional storage consumption for said restore of said received data.

20. The computer program product of claim 19, further comprising a fourteenth computer program code for performing an integrity check configured to rectify errors in said identified unique variable sized data chunks by adding a parity file to each of said one or more chunk files where said identified unique variable sized data chunks are stored.

21. The computer program product of claim 20, further comprising a fifteenth computer program code for maintaining information of said parity file in a backup file stored at one or more of a plurality of data restore levels for facilitating said integrity check at said one or more of said data restore levels, wherein said data restore levels comprise a disk image level, a chunk level, a repository level, a client level, and a backup level.

22. The computer program product of claim 19, further comprising:
- a sixteenth computer program code for receiving said stored third metadata comprising said location of said storage of said each of said identified unique variable sized data chunks in said one or more chunk files and a pointer for each of said duplicate variable sized data chunks from said one or more databases, wherein said pointer points to a unique instance of said each of said duplicate variable sized data chunks;
- a seventeenth computer program code for retrieving said identified unique variable sized data chunks from said one or more chunk files using said location of said storage of said each of said identified unique variable sized data chunks in said one or more chunk files from said received third metadata;
- an eighteenth computer program code for retrieving, from said one or more chunk files, said unique instance of said each of said duplicate variable sized data chunks, to which said pointer from said received third metadata points for retrieving said each of said duplicate variable sized data chunks;
- a nineteenth computer program code for receiving said stored second metadata comprising said logical boundaries used for said splitting of said received data into said fixed sized data chunks and said stored first metadata comprising said file-to-sector mapping information from said one or more databases; and
- a twentieth computer program code for assembling said retrieved unique variable sized data chunks and said retrieved unique instance of said each of said duplicate variable sized data chunks in a predefined order for regenerating and restoring said each of said fixed sized data chunks using said received second metadata at a target location identified using said received first metadata.

23. The computer program product of claim 19, further comprising a twenty first computer program code for performing an incremental backup for maintaining data changed after each said backup of said received data, wherein said incremental backup comprises identifying and storing changed unique variable sized data chunks and additional unique variable sized data chunks in said one or more chunk files based on said logical boundaries obtained from said stored second metadata.

24. The computer program product of claim 23, wherein said twenty first computer program code comprises a twenty second computer program code for storing metadata of each of said changed unique variable sized data chunks and each of said additional unique variable sized data chunks in said one or more databases for allowing each said incremental backup to be used instantly as a full backup, without merging with previous increments.

* * * * *